(12) United States Patent
Hamlin et al.

(10) Patent No.: US 9,092,601 B2
(45) Date of Patent: Jul. 28, 2015

(54) SYSTEM AND METHOD FOR CREATING AND MANAGING OBJECT CREDENTIALS FOR MULTIPLE APPLICATIONS

(71) Applicant: Dell Products, LP, Round Rock, TX (US)

(72) Inventors: Daniel L. Hamlin, Round Rock, TX (US); Kenneth W. Stufflebeam, Georgetown, TX (US); Amy C. Nelson, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 108 days.

(21) Appl. No.: 13/784,034

(22) Filed: Mar. 4, 2013

(65) Prior Publication Data

US 2014/0250508 A1 Sep. 4, 2014

(51) Int. Cl.
*G06F 21/31* (2013.01)
*G06F 21/32* (2013.01)
*H04L 29/06* (2006.01)
*G06F 21/41* (2013.01)

(52) U.S. Cl.
CPC ............... *G06F 21/31* (2013.01); *G06F 21/32* (2013.01); *G06F 21/41* (2013.01); *H04L 63/083* (2013.01); *H04L 63/0861* (2013.01); *H04L 63/0815* (2013.01)

(58) Field of Classification Search
None
See application file for complete search history.

(56) References Cited

U.S. PATENT DOCUMENTS

| 5,818,939 | A | 10/1998 | Davis | |
|---|---|---|---|---|
| 5,930,358 | A | 7/1999 | Rao | |
| 6,202,157 | B1 | 3/2001 | Brownlie et al. | |
| 2002/0080974 | A1 | 6/2002 | Grawrock | |
| 2004/0002894 | A1* | 1/2004 | Kocher | 705/13 |
| 2004/0260921 | A1 | 12/2004 | Treadwell | |
| 2005/0044433 | A1 | 2/2005 | Dunstan | |
| 2006/0048222 | A1 | 3/2006 | O'Connor et al. | |
| 2007/0208668 | A1 | 9/2007 | Candelore | |
| 2007/0235517 | A1 | 10/2007 | O'Connor et al. | |
| 2008/0028446 | A1* | 1/2008 | Burgoyne | 726/6 |
| 2008/0052526 | A1 | 2/2008 | Dailey et al. | |
| 2010/0017616 | A1* | 1/2010 | Nichols et al. | 713/183 |
| 2010/0202617 | A1 | 8/2010 | Balakrishnan et al. | |
| 2011/0225428 | A1 | 9/2011 | Stufflebeam et al. | |
| 2011/0277027 | A1* | 11/2011 | Hayton et al. | 726/8 |
| 2012/0249292 | A1* | 10/2012 | Wong et al. | 340/5.52 |
| 2013/0086669 | A1* | 4/2013 | Sondhi et al. | 726/8 |

OTHER PUBLICATIONS

Credential Locker Overview, Microsoft, Aug. 29, 2012 at https://web.archive.org/web/20120829082916/http://technet.microsoft.com/en-us/library/jj554668.aspx.*

\* cited by examiner

*Primary Examiner* — Aravind Moorthy
*Assistant Examiner* — Jason Plotkin
(74) *Attorney, Agent, or Firm* — Larson Newman, LLP

(57) ABSTRACT

A method includes storing a credential object for a user to an encrypted silo on an information handling system. The credential object operates to authenticate the user to use an application. The method also includes copying the encrypted silo from the information handling system to a second information handling system, retrieving at the second information handling system the credential object from the copy of the encrypted silo, and authenticating the user to use the application on the second information handling system using the credential object.

20 Claims, 23 Drawing Sheets

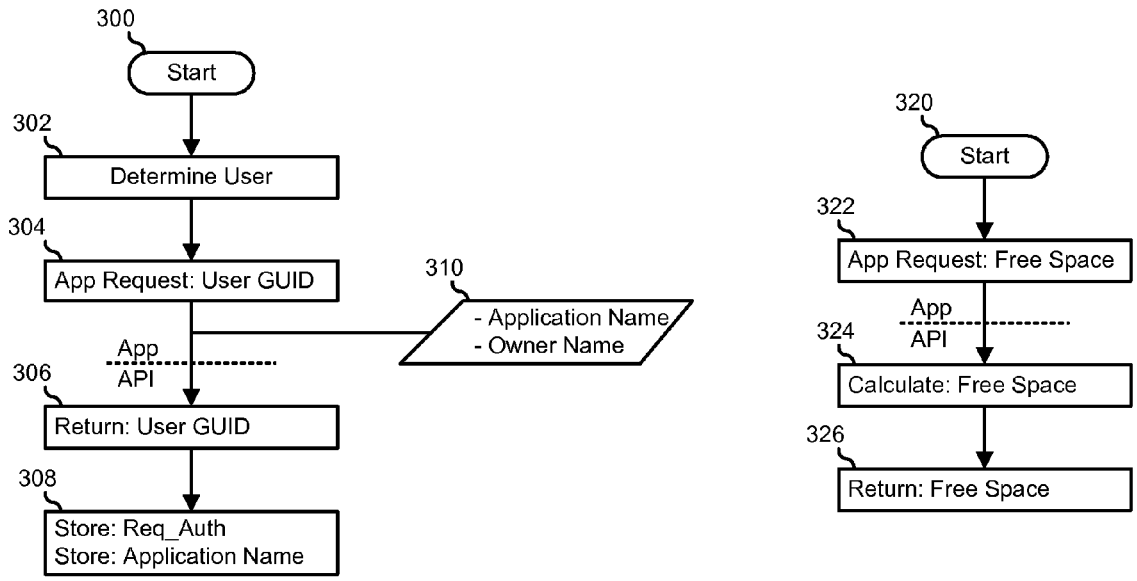
FIG. 3
FIG. 4
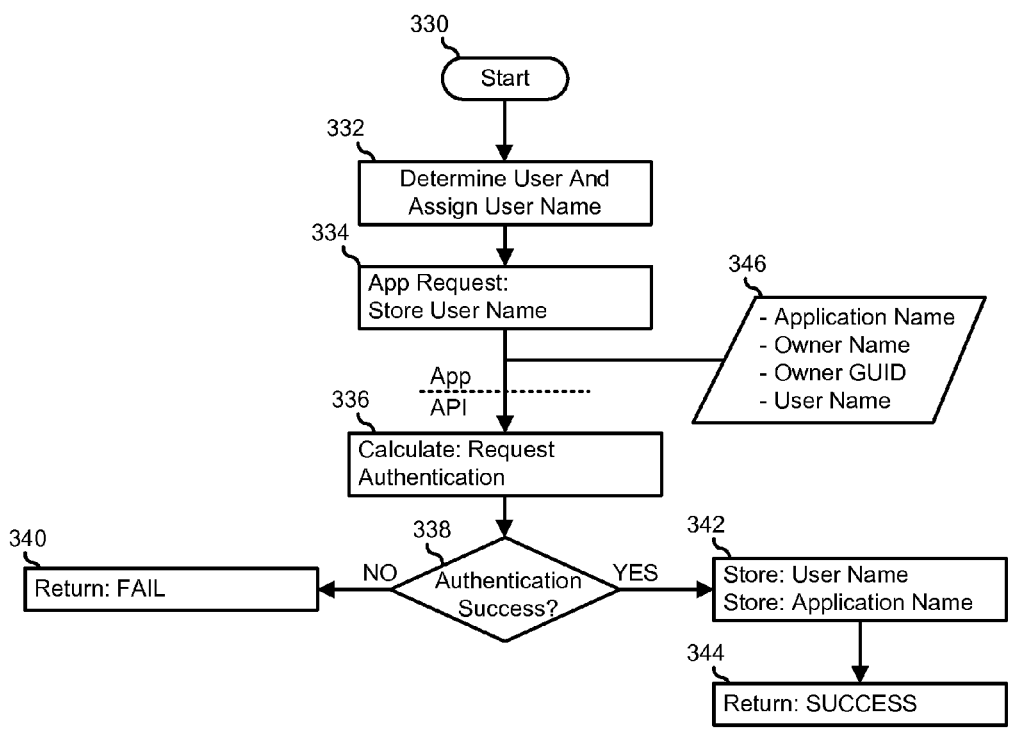
FIG. 5

SYSTEM AND METHOD FOR CREATING AND MANAGING OBJECT CREDENTIALS FOR MULTIPLE APPLICATIONS

FIELD OF THE DISCLOSURE

This disclosure relates generally information handling systems, and more particularly relates to creating and managing object credentials for multiple applications.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIGS. 3-24 are flow charts illustrating methods for an application programming interface to access and manipulate a provincial silo according to an embodiment of the present disclosure.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
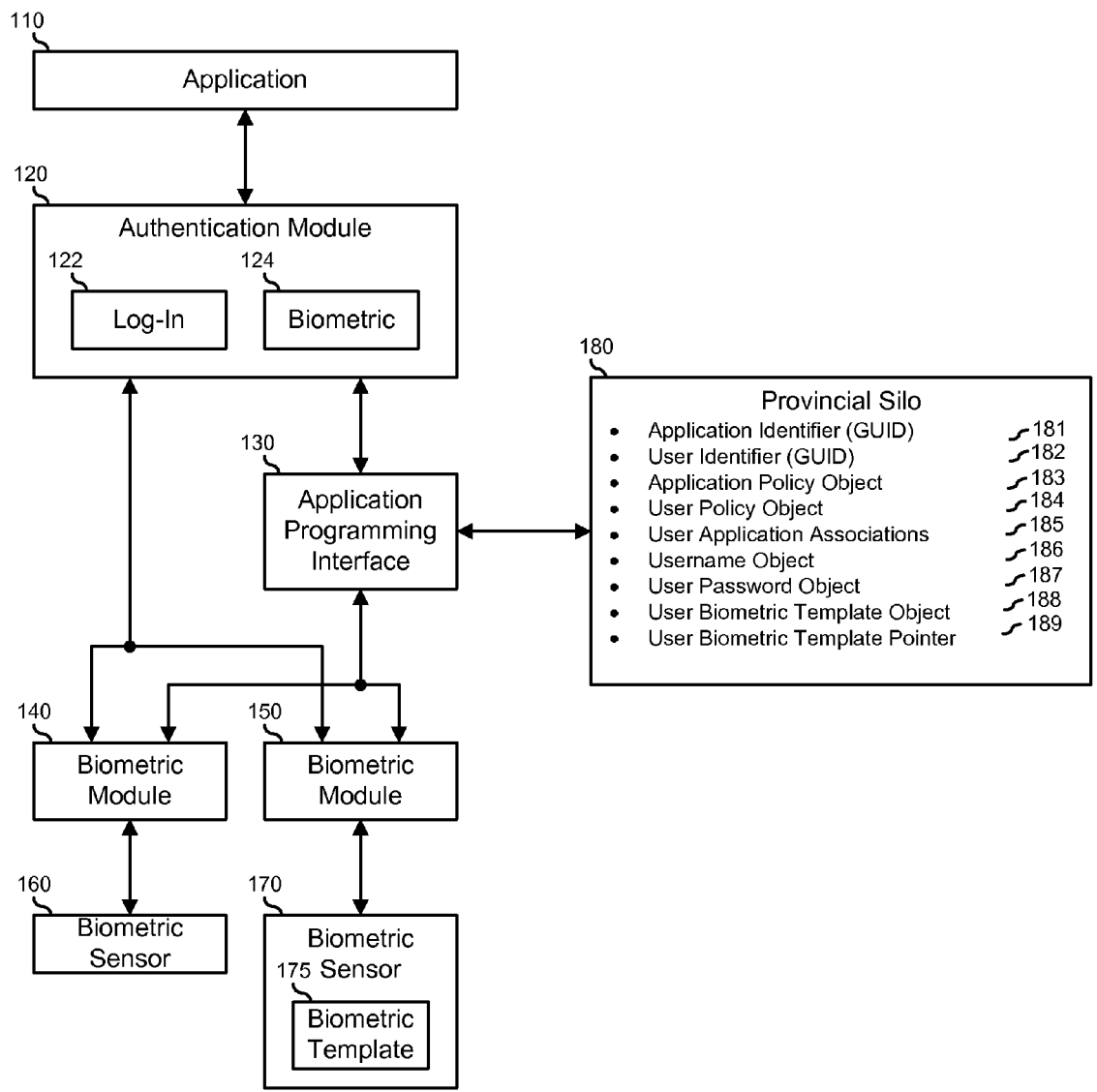
FIG. 1 is a block diagram illustrating an information handling system according to an embodiment of the present disclosure.

FIG. 1 illustrates an information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 includes an application 110, an authentication module 120, an application programming interface (API) 130, biometric modules 140 and 150, biometric sensors 160 and 170, and a provincial silo 180. Application 110 is connected to authentication module 120. Authentication module 120 includes a log-in service 122 and a biometric service 124, and is connected to biometric modules 140 and 150. API 130 is connected to authentication module 120, to biometric modules 140 and 150, and to provincial silo 180. Biometric module 140 is connected to biometric sensor 160, and biometric module 140 is connected to biometric sensor 170. Biometric sensor 170 includes a biometric template 175.

Application 110 represents one or more services or programs that provide functionality for information handling system 100. For example, application 110 can represent the functionality of an operating system (OS) instantiated on information handling system 100, background services of the OS, application programs running on the information handling system, other program software or code operating on the information handling system, or a combination thereof. Access to the functionality of application 110 can be restricted or limited to authorized users or services. For example, where application 110 seeks to access an external network, access to the external network can be blocked unless information handling system 100 has been logged on to the external network. Here, application 100 accesses log-in service 122 to prompt a user for log in credentials, such as a user name and a password, and the log-in service verifies that the user name represents a valid user, and that the password matches that of the user. In a particular embodiment, log-in service 122 operates to compare user provided log in credentials with valid user credentials in a credential repository. For example, log-in service 122 can provide a prompt to a user to provide the user's log in credentials, and the log-in service can query the credential repository to determine if the provided user credentials are valid. In another embodiment, log-in service 122 operates to store the log in credentials, and to automatically provide the log in credentials upon request. For example, once a user has logged onto information handling system 100, then subsequent acts of logging the user in to a database, a network, or the like, can be performed by log-in service 122 without intervention of the user.

In another example, a user can be restricted or have access to limited functionality of application 110 until a biometric authentication of the user is completed. Here, application 100 accesses biometric service 124 to prompt a user to provide a biometric signature to one or more of biometric sensors 160 and 170, such as a finger print scan, a retinal scan, a DNA scan or another biometric identifier of the user, and the biometric service verifies that the user is a valid user of information handling system 100. Biometric service 124 operates to compare user provided biometric information with a valid biometric template from a biometric template repository. Here, biometric service 124 provides a prompt to a user to provide a biometric input to biometric sensor 160, and the biometric sensor scans the user's biometric information to provide a biometric template associated with the information to biometric module 140. Biometric service 124 then compares the received biometric template from the user with the valid templates in the template repository to determine if the user is a valid user. If so, the user is authenticated onto information handling system 100 and is given access to the functionality of application 110.

Biometric service 124 also operates to receive the results of a comparison between user provided biometric information and a valid biometric template from a biometric sensor 170. Here, biometric service 124 provides a prompt to a user to provide a biometric input to biometric sensor 170, and the biometric sensor scans the user's biometric information to provide a biometric template associated with the information. In this case, biometric sensor 170 includes a NVRAM that includes one or more valid biometric templates 175 that are compared to the scanned biometric information, and the biometric sensor determines if the user is a valid user. Biometric sensor 170 then provides an indication as to whether or not the user is a valid user to biometric module 150 to authenticate the user onto information handling system 100.

API 130 operates to provide extensions in the interfaces between authentication module 120 and biometric modules 140 and 150, such that authentication credentials for various users of information handling system 100 and application 110 are securely stored and maintained on provincial silo 180. Thus, in a particular embodiment, when a user seeks to access application 110, log-in service 122 prompts the user for the user's log in credentials, provides a request to API 130 to search provincial silo 180 for the user and an associated password, and compares to user provided credentials with the search results to determine if the user is authenticated to use application 110. Further, when application 110 seeks to access an external network, log-in service 122 provides a request to API 130 to query provincial silo 180 to provide the user's log in credentials to the external network.

Further, API 130 operates to provide a biometric template repository for users of information handling system 100. Here, biometric service 124 prompts a user to provide a biometric signature to one or more of biometric sensors 160 and 170, and the biometric service compares the user provided biometric information with the valid biometric templates in provincial silo 180. Here, biometric sensor 160 scans the user's biometric information to provide a biometric template associated with the information to biometric module 140, and biometric service 124 compares the received biometric template from the user with the valid templates in provincial silo 180 to determine if the user is a valid user. Where biometric service 124 operates to receive the results of a comparison between user provided biometric information and a valid biometric template from a biometric sensor 170, API 130 operates to determine a pointer to the valid biometric template 175.

Provincial silo 180 operates as a container for securely holding the authentication objects that are passed between application 110, authentication module 120, biometric modules 140 and 150, and other elements of information handling system 100, such as an external network or the like. As such, API 130 includes encryption utilities to securely store provincial silo 180 on a system memory of information handling system 100. For example, provincial silo 180 can reside on an encrypted storage device, or can represent an encrypted file stored in a non-encrypted storage device. As such, provincial silo 180 can be stored in a NVRAM or system memory of information handling system 100, on a disk drive or solid state drive of the information handling system, on a network storage device, or another storage device, as needed or desired. Provincial silo 180 also stores authentication objects for multiple applications similar to application 110, and for multiple users, and provides policy objects for the multiple applications and users.

Provincial silo 180 includes application identifier objects 181, user identifier objects 182, application policy objects 183, user policy objects 184, user application associations 185, username objects 186, password objects 187, user biometric template objects 188, and user biometric template pointer objects 189. Application identifier 181 represents one or more objects associated with each application that utilizes provincial silo 180. User identifier 182 represents one or more objects associate with each user that is authorized to access the applications identified by application identifier 181. Application identifier 181 and user identifier 182 are each associated with a unique identifier such as a Globally Unique IDentifer (GUID). Application policy object 183 represents an association between application identifier 181 and the authentication activities that are utilized to authorize access to the application. For example, a particular application may be associated with a user log in credential, a finger print scan, and a retinal scan, while another application may be associated with only a user log in. Similarly, user policy object 184 represents an association between user identifier 182 and the authentication activities that are utilized to authenticate the user. Here a particular user may be authenticated by only log in credentials, while another user may be authenticated by log in credentials and a finger print scan.

User application associations 185 represent an association between application identifier 181 and user identifier 182. As such, each user is associated with one or more applications that the user is authorized to access. Username object 186 and password object 187 represent associations between user identifier 182 and a user name and password for the user. Username object 186 and password object 187 can be used within provincial silo 180 as log in credential repository items, to check the validity of a log in attempt by a user, and, after the user is successfully authenticated, the username and password objects can be provided on behalf of the user to authenticate the user onto other services of information handling system 100, such as to log onto an external network.

User biometric template object 188 represents a biometric scan template associated with user identifier 182. As such, when a user provides biometric information to biometric sensor 160, provincial silo 180 operates as the biometric template repository, and the provided biometric information is compared with one or more user biometric template objects to authenticate the user. User biometric template pointer object 189 represents a pointer to biometric template 175 that is associated with user identifier 182. Thus, when a user provides biometric information to biometric sensor 170, user biometric template pointer 189 operates to redirect the authentication of the user to the biometric sensor to find the biometric template. In this way, authentication module 120 can perform a common set of steps for biometric authentication, regardless of whether the sensor provides the biometric template for comparison, as is the case with biometric sensor 160, or if the sensor performs the comparison, as is the case with biometric sensor 170.

Figure 2:
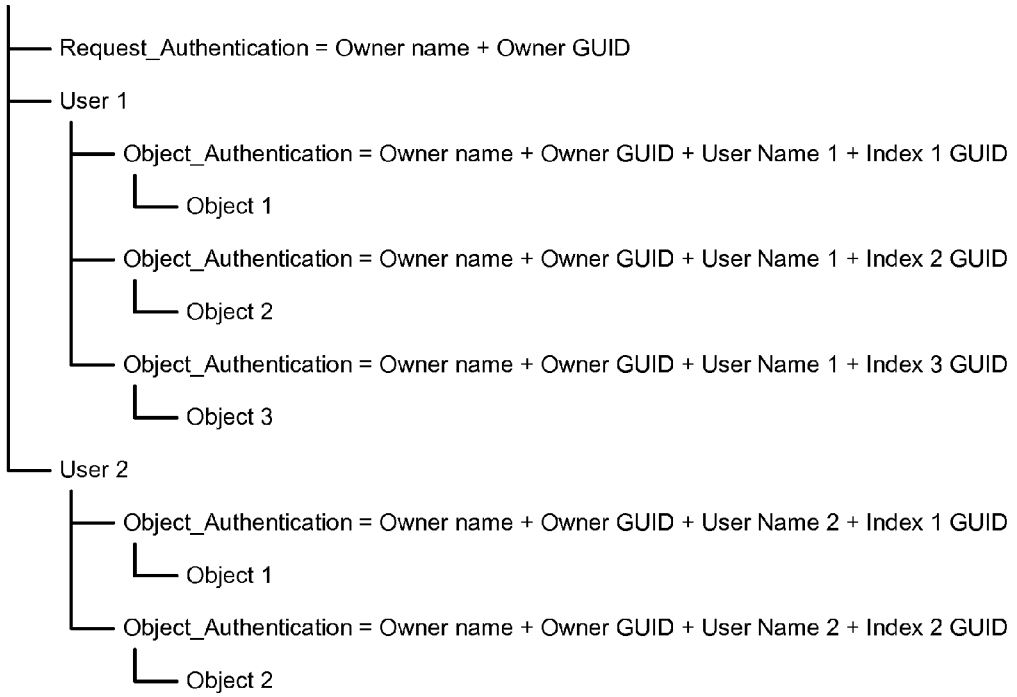
FIG. 2 illustrates a data organization for provincial silo of the information handling system of FIG. 1.
Figure 2:
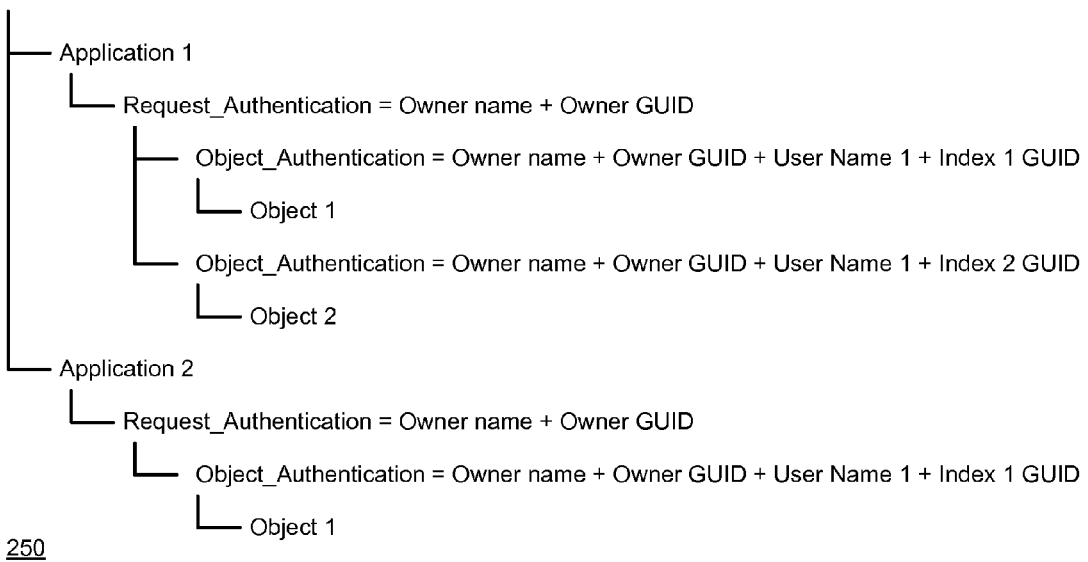

FIG. 2 illustrates an exemplary embodiment of a data organization for provincial silo 180, including a data tree 200 for an application 200 and a data tree 250 for a user. Data tree 200 includes an association between the application, an authentication request for the application, and two users of the application. Here, an authentication request is validated by the inclusion in the request of an owner name and an owner GUID. The owner name can be the name of the application, the administrator for the application, an identifier associated with the application, or another name associated with the application, as needed or desired. The owner GUID provides a unique identifier for the application. The users are each associated with several authentication objects. An authentication request for a user of the application is validated by the inclusion of the owner name, the owner GUID, the user name, and an index into the data tree that is associated with the object. Data tree 250 includes an association between the user and the applications that the user is authorized to access. Here, an authentication request is includes the owner name and the owner GUID, and an authentication request for a user of the application is validated by the inclusion of the owner name, the owner GUID, the user name, and an index into the data tree that is associated with the object.

By providing data trees 200 and 250, provincial silo 180 permits the secure portability of the credential information between information handling systems. Here, because provincial silo 180 is encrypted, a file that includes the provincial silo can be managed as needed or desired. For example, a new employee can create log in credentials and can provide biometric scans at the time of hiring, and a provincial silo for the employee can be created that associates the employee with the applications needed by the employee. The provincial silo can be provided to the employee on, for example, a USB thumb drive. Then, when the employee arrives at a designated information handling system, the file associated with the provincial silo can be loaded onto the information handling system and the employee can log in and use the information handling system. Further, when an employee no longer needs access to the information handling system, the provincial silo can be managed such that all associations with the employee are deleted from the provincial silo. Also, the employee can remove the provincial silo from the information handling system and transport it to a different information handling system, thereby transferring the employee's authentication credentials to the new information handling system.

The functionality of provincial silo 180 is enabled based upon the extensions of API 130 that permit the creation, deletion, and manipulation of the data included in the provincial silo. FIGS. 3-24 illustrate flowcharts of exemplary embodiments of the functions that are available to be performed with a provincial silo similar to provincial silo 180.

FIG. 3 illustrates a method for an application to request a user GUID, starting at block 300. An application determines that a new user is to be authorized to use the application in block 302, and the application requests a user GUID in block 304 and provides database information 310 with the request. Database information 310 includes the application name and the owner name. The method proceeds from the application to an API where the API returns a user GIUD in block 306, and stores a request authorization and an application name in a silo in block 308.

FIG. 4 illustrates a method for the application to request the free space of the silo, starting at block 320. The application requests the free space of the silo in block 322. The method proceeds from the application to the API and the API calculates the free space of the silo in block 324 and returns the result of the calculation in block 326.

FIG. 5 illustrates a method for the application to request to store a username, starting at block 330. The application determines that the user of the application is authenticated, and assigns a user name to the user in block 332, requests to store the user name in block 334 and provides database information 346 with the request. Database information 346 includes the application name, the owner name, the owner GUID, and the user name. The method proceeds from the application to the API where the API calculates the request authentication based upon the application name and the owner name in block 336. A decision is made as to whether or not the request authentication was successful in decision block 338. If not, the "NO" branch of decision block 338 is taken and the API returns a request fail indication in block 340. If the request authentication was successful, the "YES" branch of decision block 338 is taken, the API stores the user name and the application name in block 342, and returns a request success indication in block 344.

Figure 6:
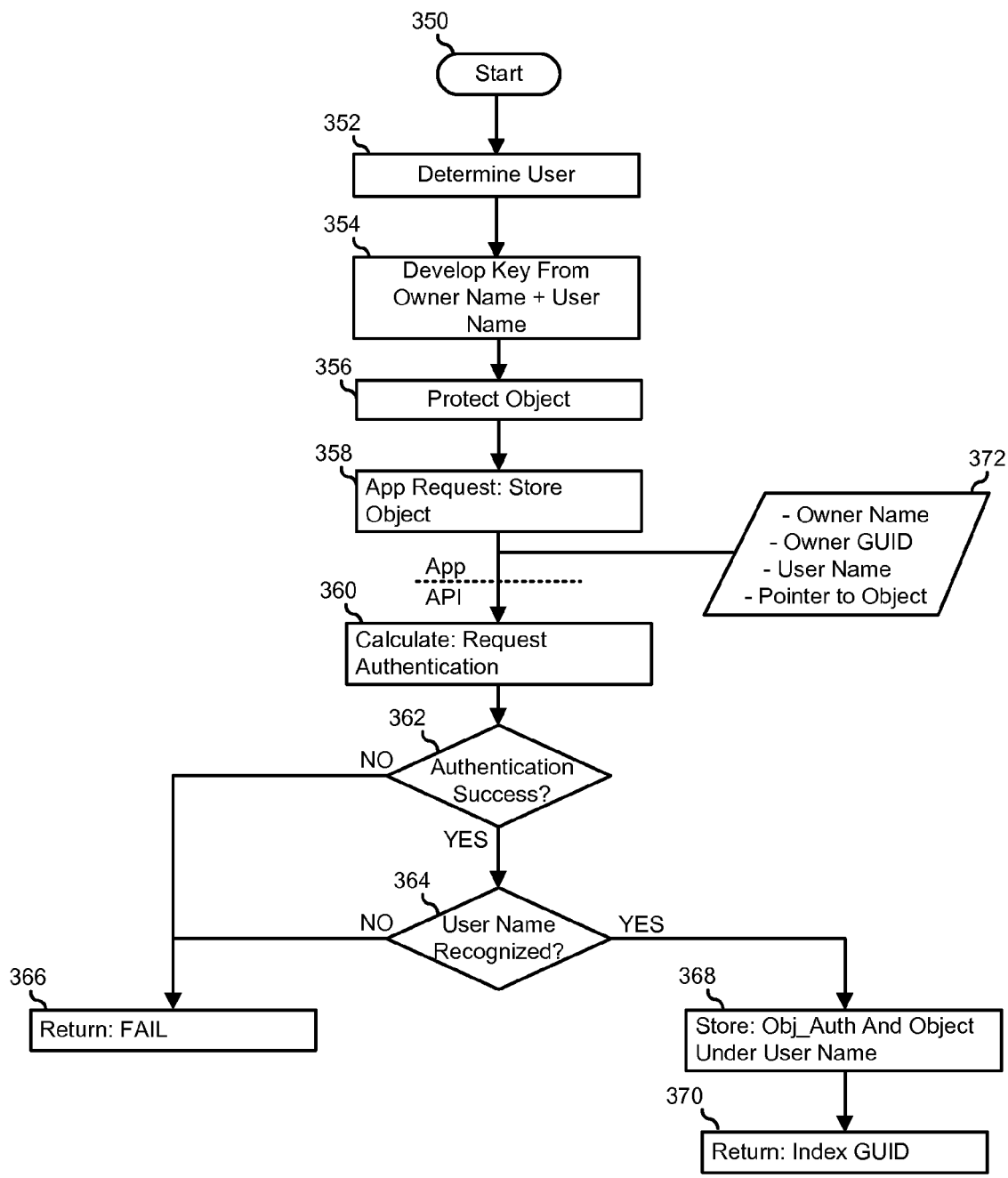

FIG. 6 illustrates a method for the application to request to store an object, starting at block 350. The application determines that the user of the application is authenticated in block 352, and develops a key from the owner name and the user name in block 354. The object is protected using the key in block 356. Here, the object includes the object data and recovery and mitigation metadata. The application requests to store the object in block 358 and provides database information 372 with the request. Database information 352 includes the owner name, the owner GUID, the user name, and a pointer to the object. The method proceeds from the application to the API where the API calculates the request authentication based upon the owner name and the owner GUID in block 360. A decision is made as to whether or not the request authentication was successful in decision block 362. If not, the "NO" branch of decision block 362 is taken and the API returns a request fail indication in block 366. If the request authentication was successful, the "YES" branch of decision block 362 is taken, and a decision is made as to whether or not the user name is recognized in decision block 364. If not, the "NO" branch of decision block 364 is taken and the API returns a request fail indication in block 366. If the user name is recognized, the "YES" branch of decision block 364 is taken, the API stores the object authentication and the object under the user name in block 368, and returns a request success indication in block 370.

Figure 7:
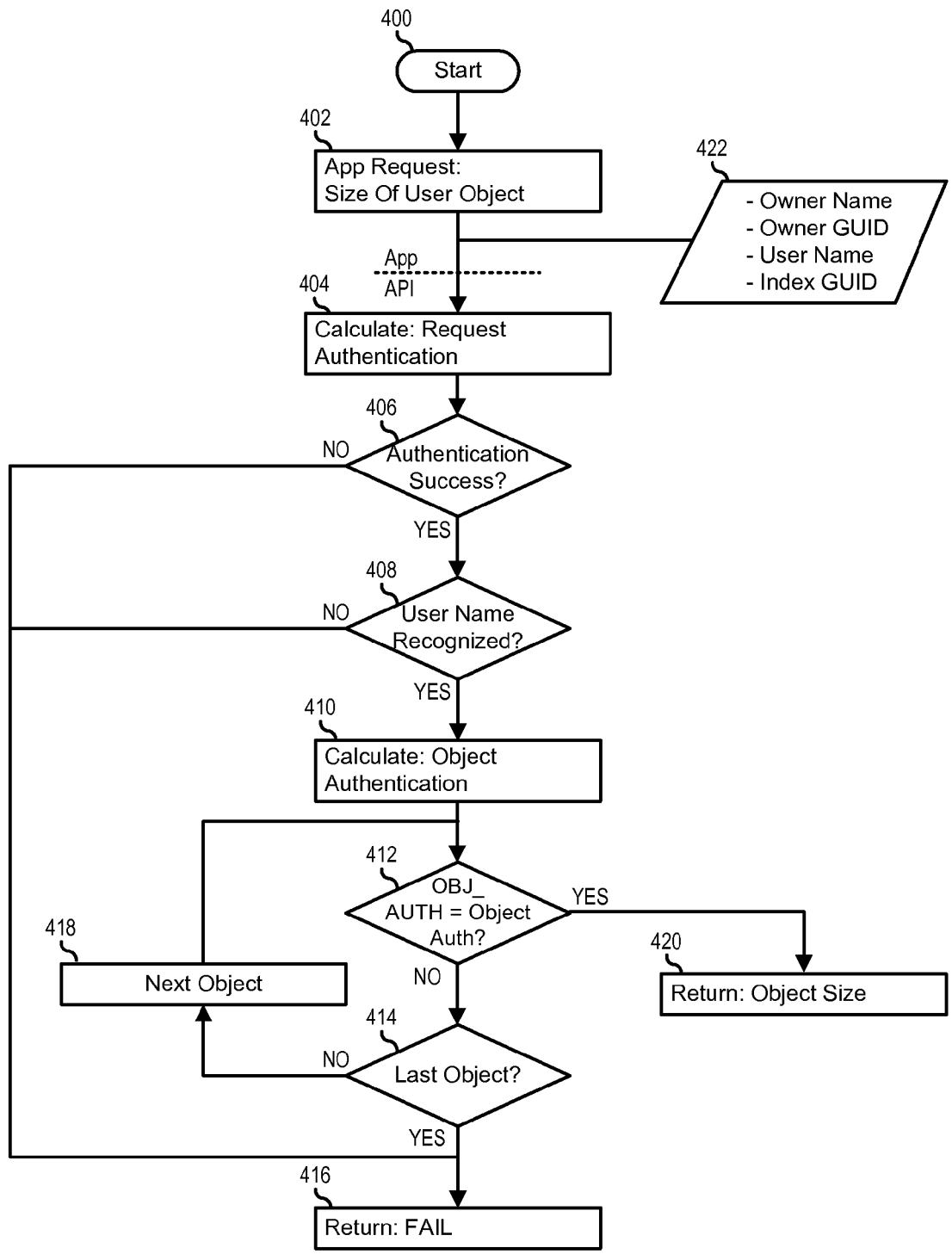

FIG. 7 illustrates a method for the application to request the size of an object associated with a user, starting at block 400. The application requests the size of the object in block 402 and provides database information 422 with the request. Database information 422 includes the owner name, the owner GUID, the user name, and an index GUID. The method proceeds from the application to the API where the API calculates the request authentication based upon the owner name and the owner GUID in block 404. A decision is made as to whether or not the request authentication was successful in decision block 406. If not, the "NO" branch of decision block 406 is taken and the API returns a request fail indication in block 416. If the request authentication was successful, the "YES" branch of decision block 406 is taken, and a decision is made as to whether or not the user name is recognized in decision block 408. If not, the "NO" branch of decision block 408 is taken and the API returns a request fail indication in block 416.

If the user name is recognized, the "YES" branch of decision block 408 is taken and the API calculates an object authentication based on the owner name, the owner GUID, the index GUID, and the user name in block 410. A decision is made as to whether or not the calculated object authentication matches the authentication for the object in decision block 412. If not, the "NO" branch of decision block 412 is taken, and a decision is made as to whether or not the object that was matched in decision block 412 is the last object in an object list associated with the user in decision block 414. If so, the "YES" branch of decision block 414 is taken and the API returns a request fail indication in block 416. If the object is not the last object, the "NO" branch of decision block 414 is taken, the next object is selected in block 418, and the method returns to decision block 412 where a decision is made as to whether or not the calculated object authentication matches the authentication for the next object. Returning to decision block 412, if the calculated object authentication matches the authentication for the object, the "YES" branch is taken and the API returns the object size in block 420.

Figure 8:
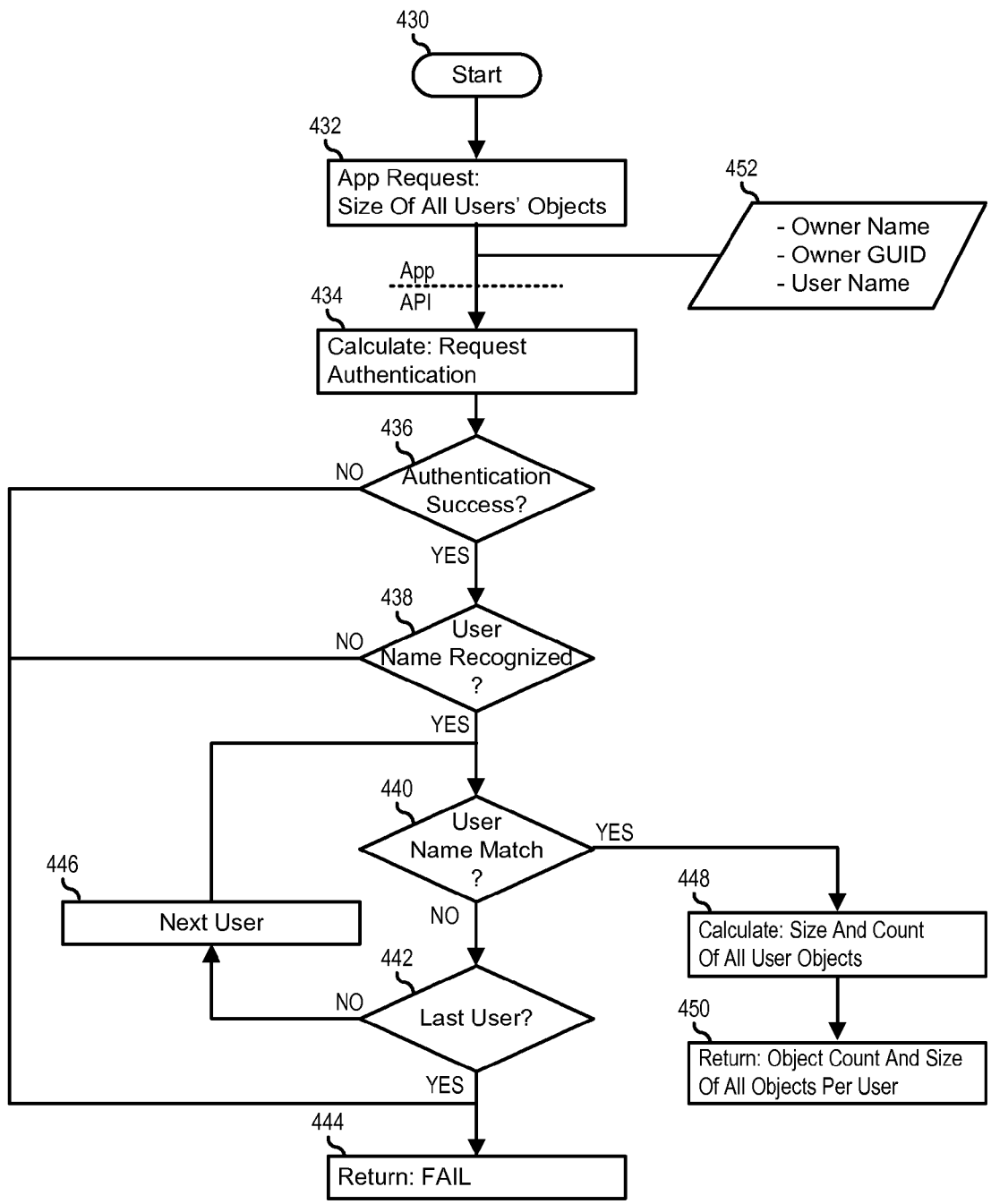

FIG. 8 illustrates a method for the application to request the size of all objects associated with a user, starting at block 430. The application requests the size of all objects associated with the user in block 430 and provides database information 452 with the request. Database information 452 includes the owner name, the owner GUID, and the user name. The method proceeds from the application to the API where the API calculates the request authentication based upon the owner name and the owner GUID in block 434. A decision is made as to whether or not the request authentication was successful in decision block 436. If not, the "NO" branch of decision block 436 is taken and the API returns a request fail indication in block 444. If the request authentication was successful, the "YES" branch of decision block 436 is taken, and a decision is made as to whether or not the user name is recognized in decision block 438. If not, the "NO" branch of decision block 438 is taken and the API returns a request fail indication in block 444.

If the user name is recognized, the "YES" branch of decision block 438 is taken and a decision is made as to whether or not the user name matches a user data tree in decision block 440. If not, the "NO" branch of decision block 440 is taken, and a decision is made as to whether or not the user data tree that was matched in decision block 4440 is the last user in an user list in decision block 442. If so, the "YES" branch of decision block 442 is taken and the API returns a request fail indication in block 444. If the user is not the last user, the "NO" branch of decision block 442 is taken, the next user is selected in block 446, and the method returns to decision block 440 where a decision is made as to whether or not the user name matches the next user data tree. Returning to decision block 440, if the user name matches a user data tree, the "YES" branch is taken, the API calculates the size and count of all objects in the user data tree in block 448, and the API returns the size and count of all objects in the user data tree in block 450.

Figure 9:
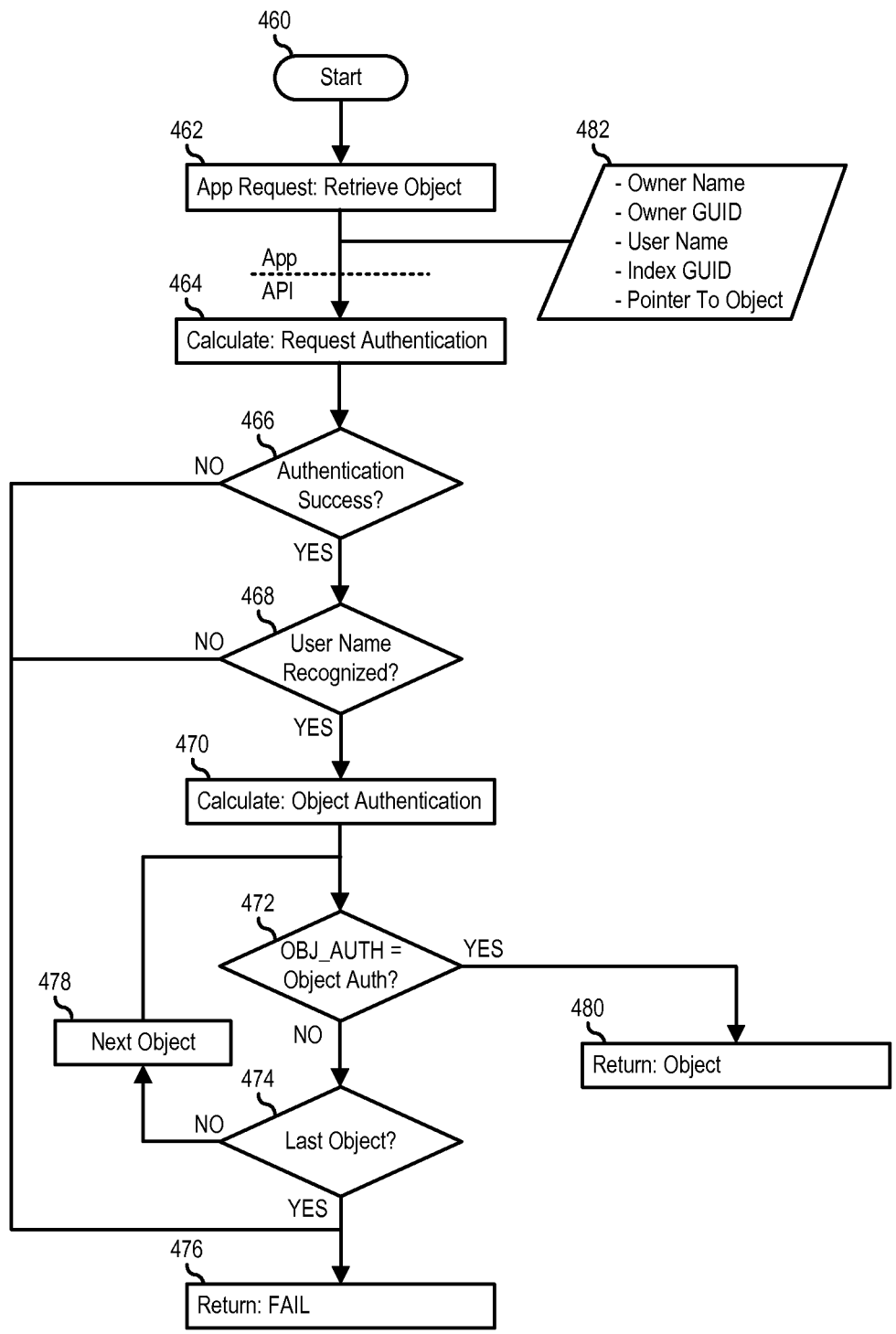

FIG. 9 illustrates a method for the application to request to retrieve an object, starting at block 460. The application requests the object in block 462 and provides database information 482 with the request. Database information 482 includes the owner name, the owner GUID, the user name, the index GUID, and the pointer to the object. The method proceeds from the application to the API where the API calculates the request authentication based upon the owner name and the owner GUID in block 464. A decision is made as to whether or not the request authentication was successful in decision block 466. If not, the "NO" branch of decision block 466 is taken and the API returns a request fail indication in block 476. If the request authentication was successful, the "YES" branch of decision block 466 is taken, and a decision is made as to whether or not the user name is recognized in decision block 468. If not, the "NO" branch of decision block 468 is taken and the API returns a request fail indication in block 476.

If the user name is recognized, the "YES" branch of decision block 468 is taken and the API calculates an object authentication based on the owner name, the owner GUID, the index GUID, and the user name in block 470. A decision is made as to whether or not the calculated object authentication matches the authentication for the object in decision block 472. If not, the "NO" branch of decision block 472 is taken, and a decision is made as to whether or not the object that was matched in decision block 472 is the last object in an object list associated with the user in decision block 474. If so, the "YES" branch of decision block 474 is taken and the API returns a request fail indication in block 476. If the object is not the last object, the "NO" branch of decision block 474 is taken, the next object is selected in block 478, and the method returns to decision block 472 where a decision is made as to whether or not the calculated object authentication matches the authentication for the next object. Returning to decision block 472, if the calculated object authentication matches the authentication for the object, the "YES" branch is taken and the API returns the object in block 480.

Figure 10:
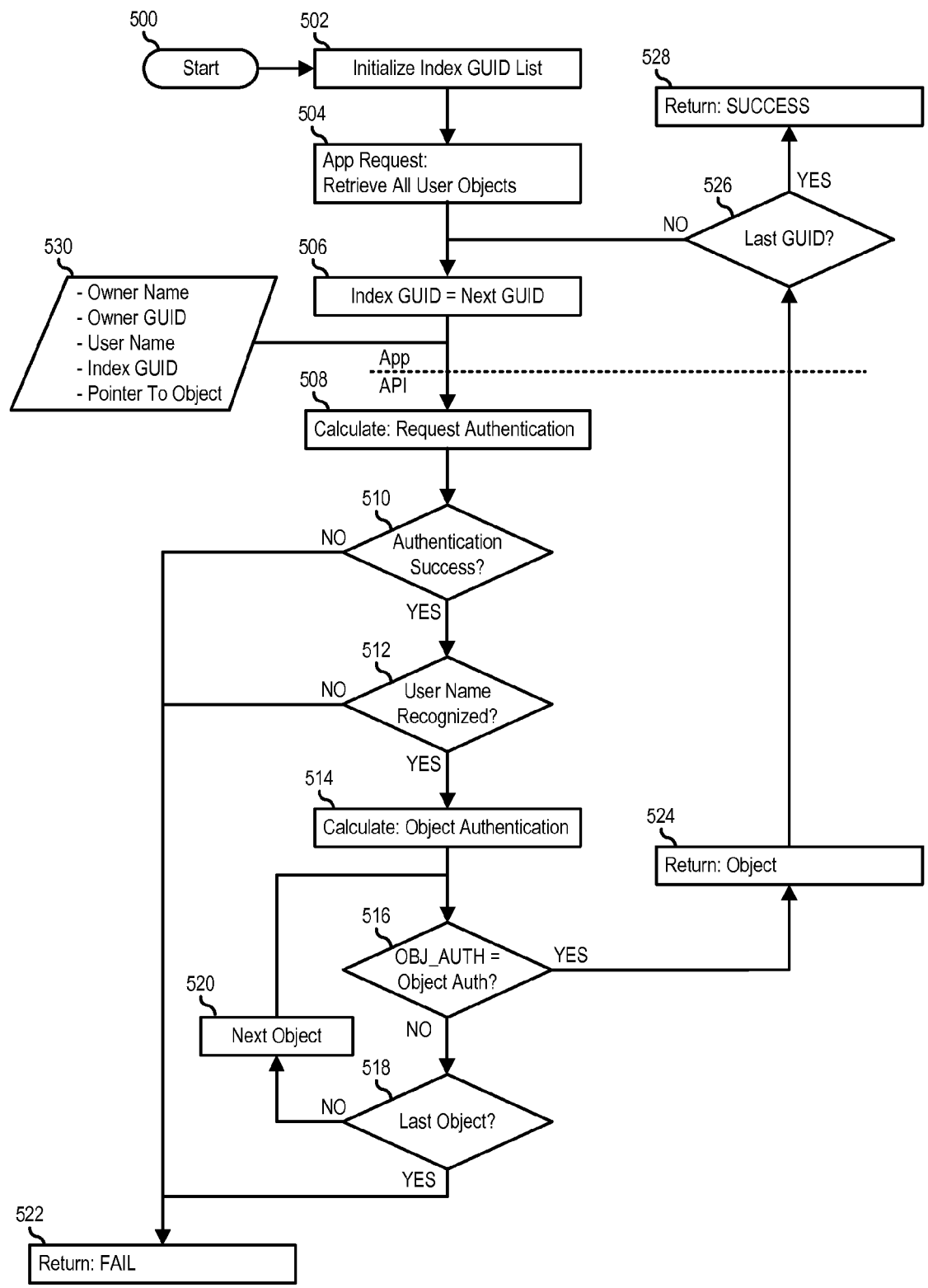

FIG. 10 illustrates a method for the application to request to retrieve all users' objects, starting at block 500. The application initializes an index GUID list in block 502, and requests all users' objects in block 504. A first index GUID is selected from the list in block 506, and database information 530 is provided with the request. Database information 530 includes the owner name, the owner GUID, the user name, the index GUID, and the pointer to the object. The method proceeds from the application to the API where the API calculates the request authentication based upon the owner name and the owner GUID in block 508. A decision is made as to whether or not the request authentication was successful in decision block 510. If not, the "NO" branch of decision block 510 is taken and the API returns a request fail indication in block 522. If the request authentication was successful, the "YES" branch of decision block 510 is taken, and a decision is made as to whether or not the user name is recognized in decision block 512. If not, the "NO" branch of decision block 512 is taken and the API returns a request fail indication in block 522.

If the user name is recognized, the "YES" branch of decision block 512 is taken and the API calculates an object authentication based on the owner name, the owner GUID, the index GUID, and the user name in block 514. A decision is made as to whether or not the calculated object authentication matches the authentication for the object in decision block 516. If not, the "NO" branch of decision block 516 is taken, and a decision is made as to whether or not the object that was matched in decision block 516 is the last object in an object list associated with the user in decision block 518. If so, the "YES" branch of decision block 518 is taken and the API returns a request fail indication in block 522. If the object is not the last object, the "NO" branch of decision block 518 is taken, the next object is selected in block 520, and the method returns to decision block 516 where a decision is made as to whether or not the calculated object authentication matches the authentication for the next object. Returning to decision block 516, if the calculated object authentication matches the authentication for the object, the "YES" branch is taken and the API returns the object in block 524. The method proceeds from the API to the application where a decision is made as to whether or not the index GUID selected in block 506 is the last index GUID in the index GUID list in decision block 526. If so, the "NO" branch of decision block 526 is taken and the application returns an indication that the request was successful in block 528. If the selected index GUID is the last index GUID in the index GUID list, the "NO" branch of decision block 526 is taken and the method returns to block 506 where the next user GUID is selected.

Figure 11:
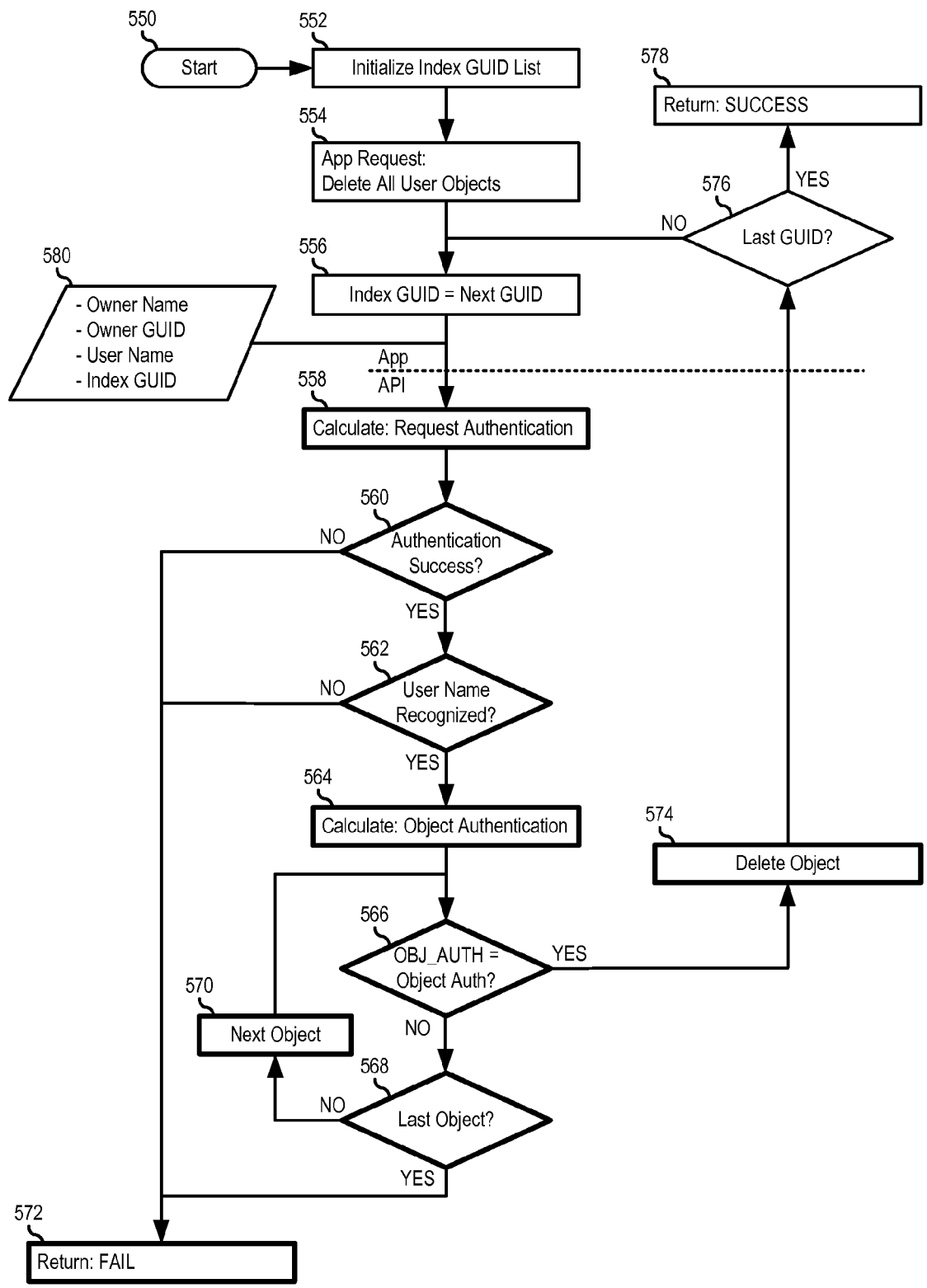

FIG. 11 illustrates a method for the application to request delete all users; objects, starting at block 550. The application initializes an index GUID list in block 552, and requests to delete all users' objects in block 554. A first index GUID is selected from the list in block 556, and database information 580 is provided with the request. Database information 580 includes the owner name, the owner GUID, the user name, the index GUID, and the pointer to the object. The method proceeds from the application to the API where the API calculates the request authentication based upon the owner name and the owner GUID in block 558. A decision is made as to whether or not the request authentication was successful in decision block 560. If not, the "NO" branch of decision block 560 is taken and the API returns a request fail indication in block 572. If the request authentication was successful, the "YES" branch of decision block 560 is taken, and a decision is made as to whether or not the user name is recognized in decision block 562. If not, the "NO" branch of decision block 562 is taken and the API returns a request fail indication in block 572.

If the user name is recognized, the "YES" branch of decision block 562 is taken and the API calculates an object authentication based on the owner name, the owner GUID, the index GUID, and the user name in block 564. A decision is made as to whether or not the calculated object authentication matches the authentication for the object in decision block 566. If not, the "NO" branch of decision block 566 is taken, and a decision is made as to whether or not the object that was matched in decision block 566 is the last object in an object list associated with the user in decision block 568. If so, the "YES" branch of decision block 568 is taken and the API returns a request fail indication in block 572. If the object is not the last object, the "NO" branch of decision block 568 is taken, the next object is selected in block 570, and the method returns to decision block 566 where a decision is made as to whether or not the calculated object authentication matches the authentication for the next object. Returning to decision block 566, if the calculated object authentication matches the authentication for the object, the "YES" branch is taken and the API deletes the object in block 574. The method proceeds from the API to the application where a decision is made as to whether or not the index GUID selected in block 556 is the last index GUID in the index GUID list in decision block 576. If so, the "NO" branch of decision block 576 is taken and the application returns an indication that the request was successful in block 578. If the selected index GUID is the last index GUID in the index GUID list, the "NO" branch of decision block 576 is taken and the method returns to block 556 where the next user GUID is selected.

Figure 12:
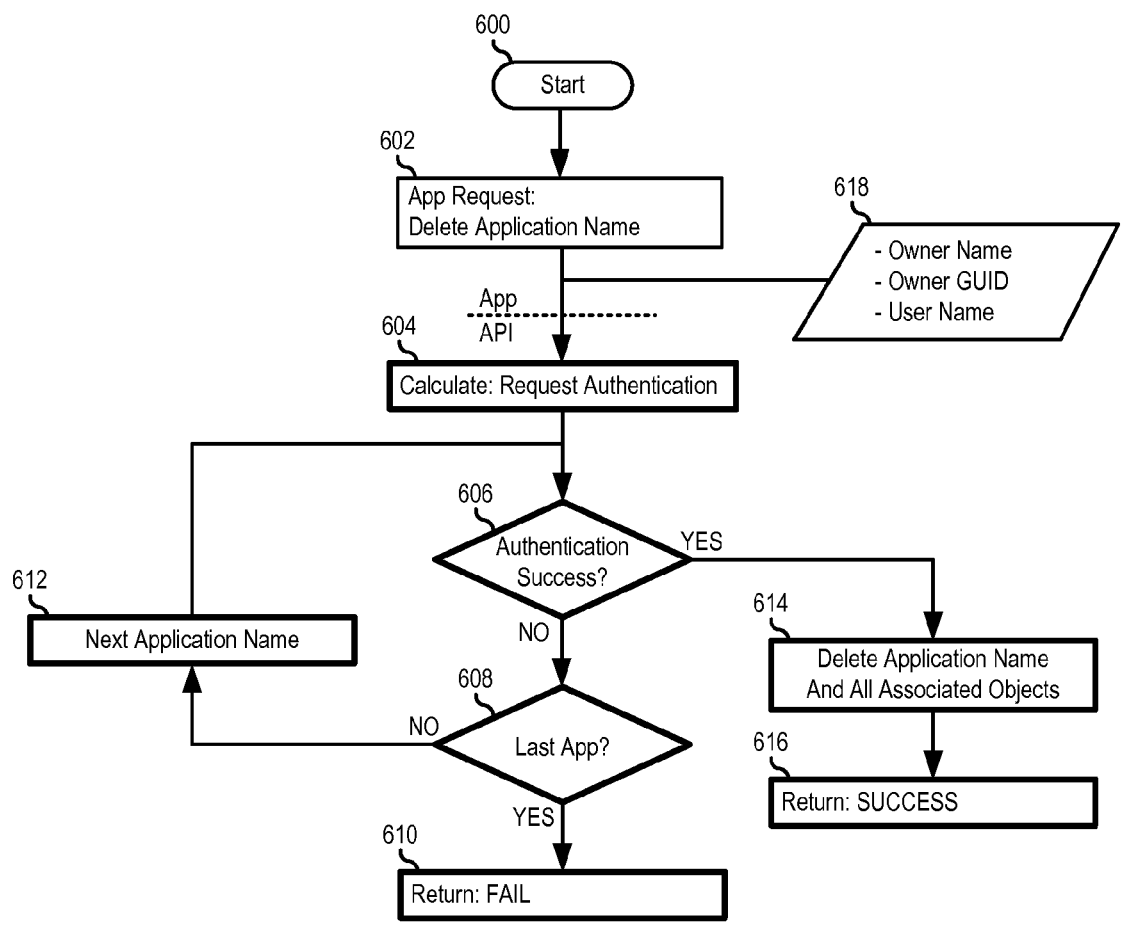

FIG. 12 illustrates a method for the application to request to delete an application, starting at block 600. The application requests to delete an application in block 602 and provides database information 618 with the request. Database information 618 includes the owner name, the owner GUID, and the user name. The method proceeds from the application to the API where the API calculates the request authentication based upon the owner name and the owner GUID in block 604. A decision is made as to whether or not the request authentication was successful in decision block 606. If not, the "NO" branch of decision block 606 is taken and a decision is made as to whether or not the application is the last application in an application list in decision block 608. If so, the "YES" branch of decision block 608 is taken and the API returns a request fail indication in block 610. If the application is not the last application, the "NO" branch of decision block 608 is taken, the next application is selected in block 612, and the method returns to decision block 606 where a decision is made as to whether or not the request authentication was successful. Returning to decision block 606, if the request authentication was successful, the "YES" branch is taken, the API deletes the application and all objects associated with the application from the silo in block 614, and the API returns a request successful indication in block 616.

Figure 13:
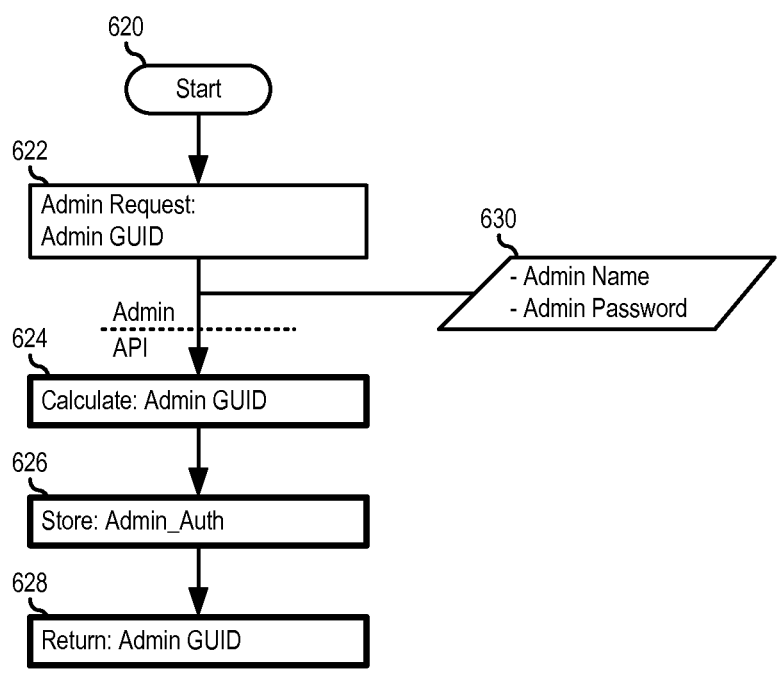

FIG. 13 illustrates a method for an admin to request an admin GUID, starting at block 620. An admin requests an admin GUID in block 622 and provides database information 630 with the request. Database information 630 includes an admin name and an admin password. The method proceeds from an administrator application to the API where the API calculates an admin GUID in block 624, stores an admin authentication based upon the admin name, the admin password, and the admin GIUD in block 626, returns the admin GUID in block 628.

Figure 14:
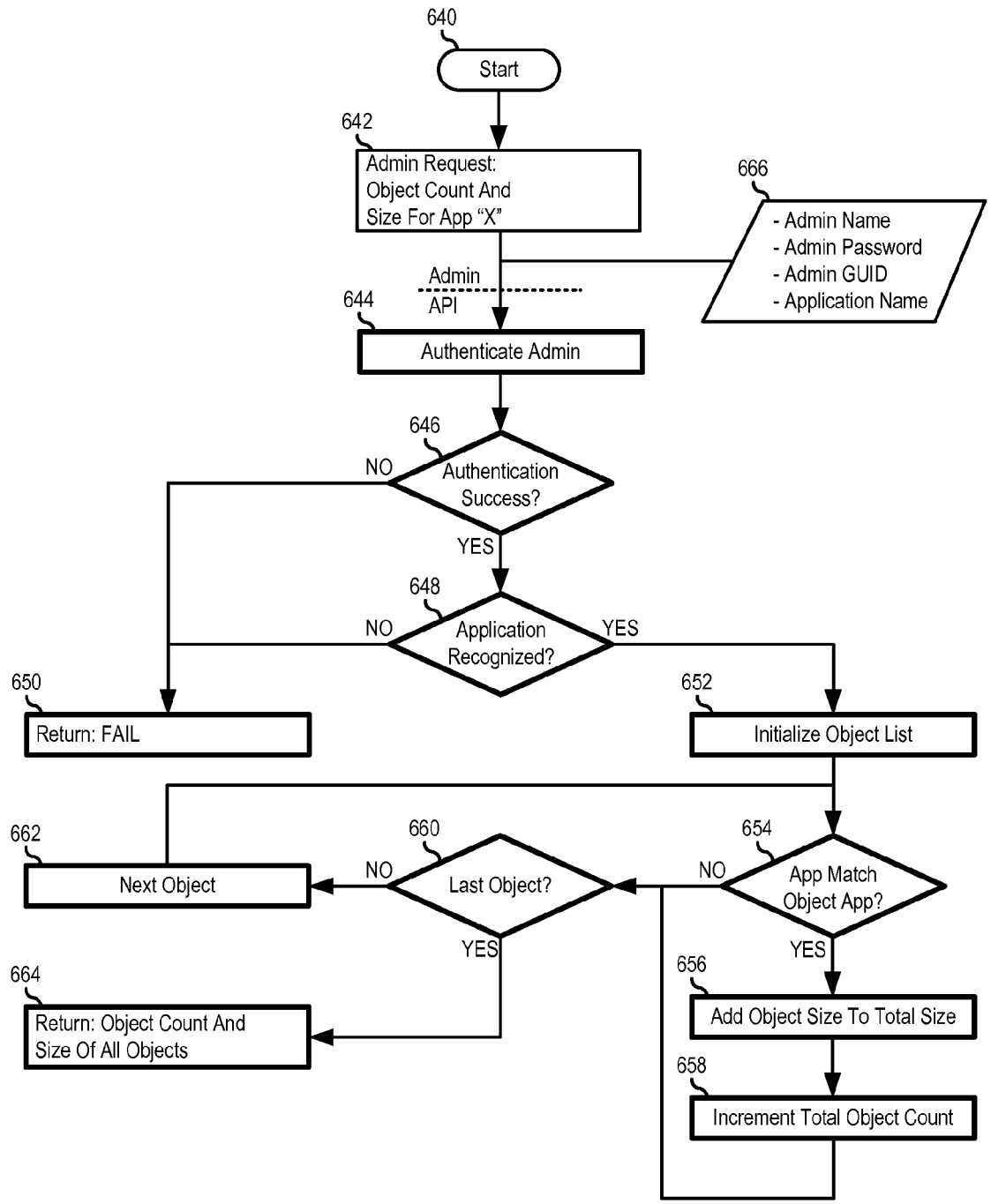

FIG. 14 illustrates a method for the administrator to request an object count and size for all objects associated with an application, starting at block 600. The admin requests an object count and size for all objects associated with an application in block 642 and provides database information 666 with the request. Database information 666 includes an admin name, an admin password, an admin GUID, and an application name. The method proceeds from the administrator application to the API where the API authenticates the admin based upon the admin name, the admin password, and the admin GUID in block 644. A decision is made as to whether or not the admin authentication was successful in decision block 646. If not, the "NO" branch of decision block 646 is taken and the API returns a request fail indication in block 650. If the admin authentication was successful, the "YES" branch of decision block 646 is taken and a decision is made as to whether or not the application is recognized in decision block 648. If not, the "NO" branch of decision block 648 is taken and the API returns a request fail indication in block 650. If the application was recognized, the "YES" branch of decision block 648 is taken and an object list is initialized in block 652.

A decision is made as to whether or not a first object in the object list is associated with the application in decision block 654. If not, the "NO" branch of decision block 654 is taken and the method proceeds to decision block 660 as described below. If the first object is associated with the application, the "YES" branch of decision block 654 is taken, the size of the object is added to the total size of the objects associated with the application in block 656, a total object count is incremented in block 658, and the method proceeds to decision block 660 where a decision is made as to whether or not the object is the last object in the object list. If so, the API returns the object count and the size of all of the objects in block 664. If the object is not the last object in the object list, the "NO" branch of decision block 660 is taken, the next object from the list is selected in block 662, and the method returns to decision block 654 where a decision is made as to whether or not the next object is associated with the application.

Figure 15:
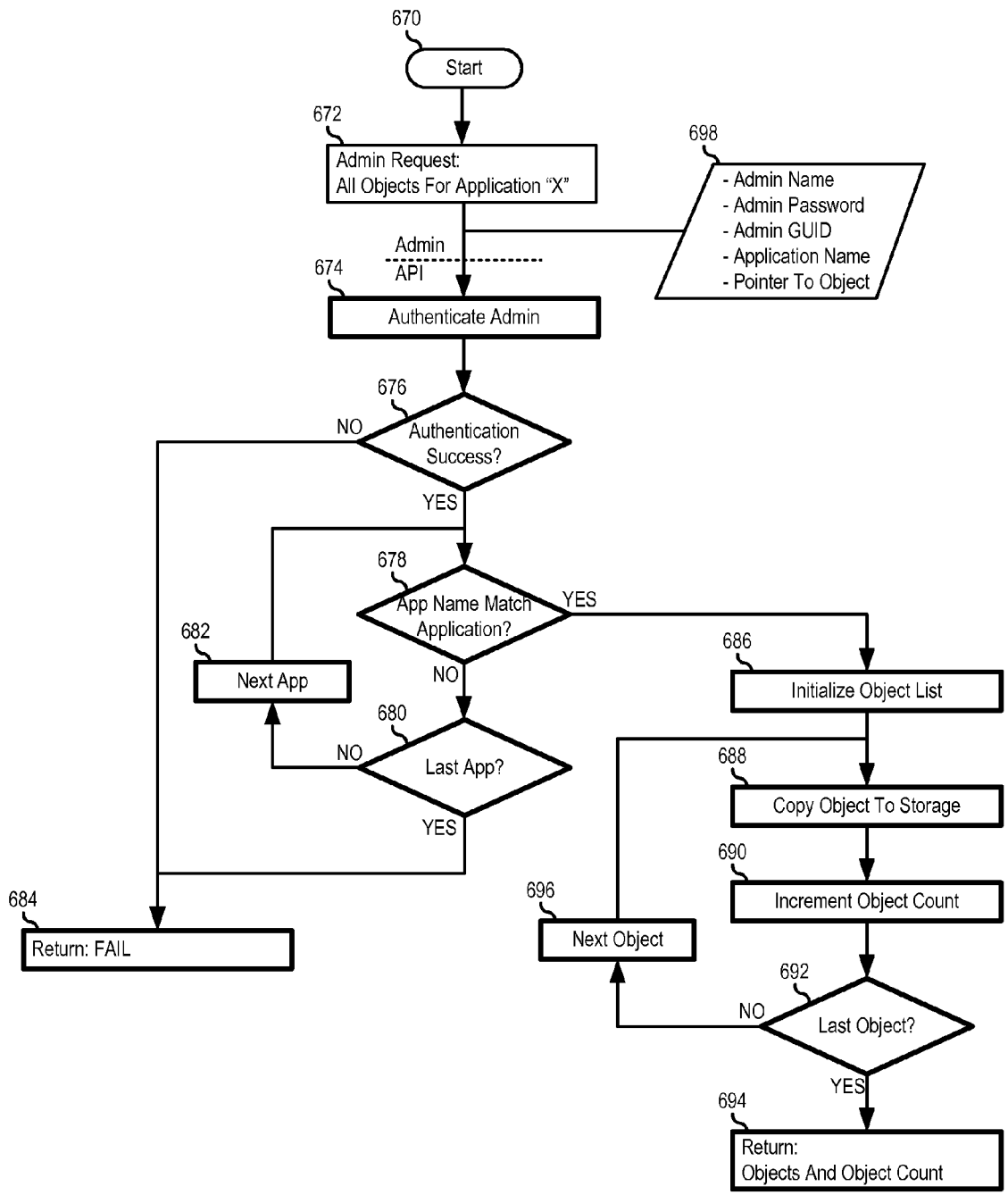

FIG. 15 illustrates a method for the administrator to request all objects associated with an application, starting at block 670. The admin requests all objects associated with the application in block 672 and provides database information 698 with the request. Database information 698 includes an admin name, an admin password, an admin GUID, an application name, and a pointer to the first object. The method proceeds from the administrator application to the API where the API authenticates the admin based upon the admin name, the admin password, and the admin GUID in block 674. A decision is made as to whether or not the admin authentication was successful in decision block 676. If not, the "NO" branch of decision block 676 is taken and the API returns a request fail indication in block 684. If the admin authentication was successful, the "YES" branch of decision block 676 is taken and a decision is made as to whether or not a first application name matches the provided application name in decision block 678. If not, the "NO" branch of decision block 648 is taken and a decision is made as to whether or not the application name matched in decision block 678 is the last application in a list of applications in decision block 680. If so, the "YES" branch of decision block 680 is taken and the API returns a request fail indication in block 650. If the application is not the last application, the "YES" branch of decision block 680 is taken, a next application in the application list is selected in block 682, and the method returns to decision block 678 where a decision is made as to whether or not the next application name matches the provided application name.

Returning to decision block 678, if the application name matches the provided application name, the "YES" branch is taken and an object list is initialized in block 686. The object is copied to a storage device in block 688, and an object count is incremented in block 690. A decision is made as to whether or not the object is the last object in the object list in decision block 692. If not, the "NO" branch of decision block 692 is taken, a next object in the object list is selected in block 696, and the method returns to block 688 where the next object is copied to a storage device. If the object is the last object in the object list, the "YES" branch of decision block 692 is taken and the API returns the objects and the object count in block 694.

Figure 16:
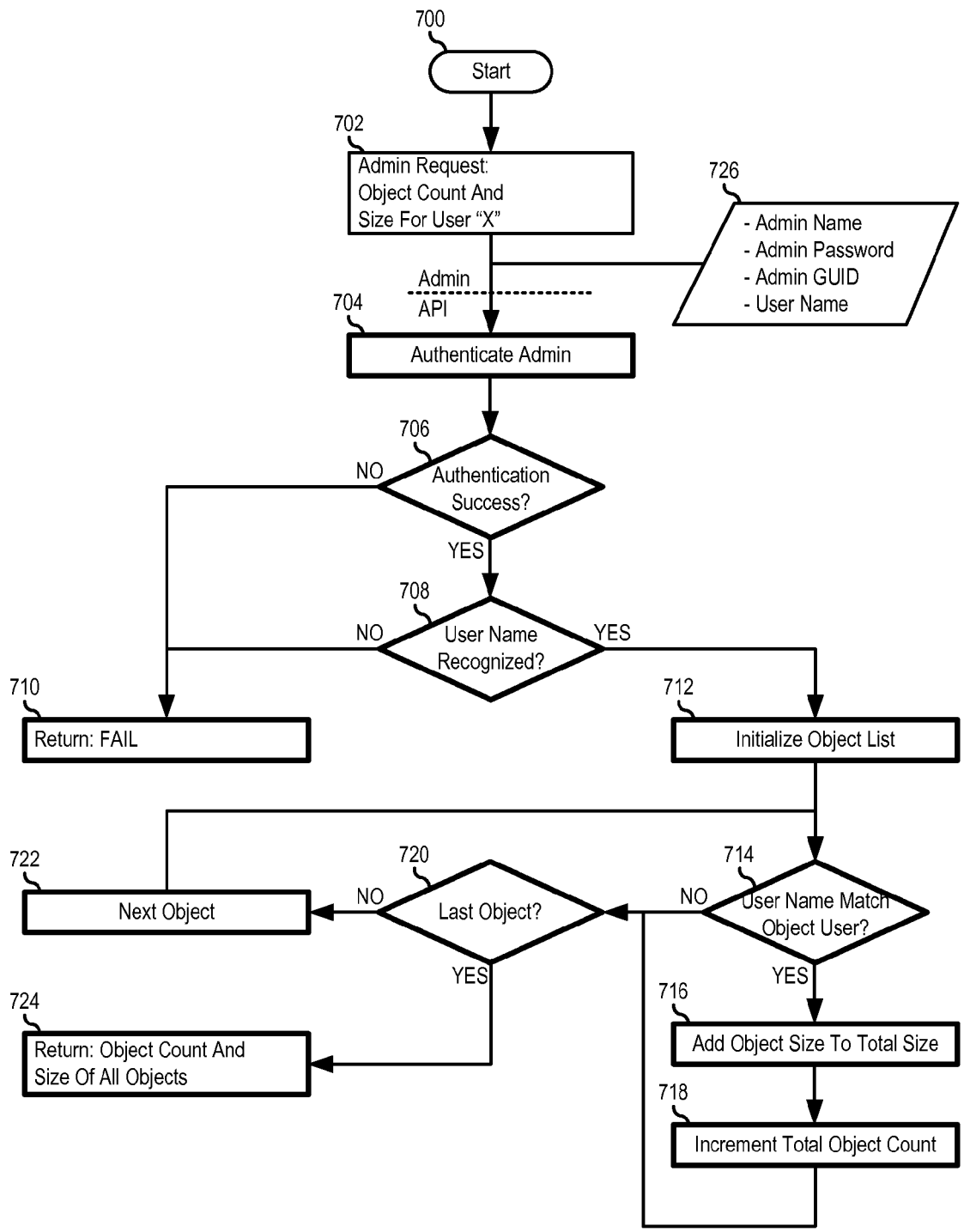

FIG. 16 illustrates a method for the administrator to request an object count and size for all objects associated with a user, starting at block 700. The admin requests the object count and size for all objects associated with the user in block 702 and provides database information 726 with the request. Database information 726 includes an admin name, an admin password, an admin GUID, and a user name. The method proceeds from the administrator application to the API where the API authenticates the admin based upon the admin name, the admin password, and the admin GUID in block 704. A decision is made as to whether or not the admin authentication was successful in decision block 706. If not, the "NO" branch of decision block 706 is taken and the API returns a request fail indication in block 710. If the admin authentication was successful, the "YES" branch of decision block 706 is taken and a decision is made as to whether or not the application is recognized in decision block 708. If not, the "NO" branch of decision block 708 is taken and the API returns a request fail indication in block 710. If the application was recognized, the "YES" branch of decision block 708 is taken and an object list is initialized in block 712.

A decision is made as to whether or not a first object in the object list is associated with the user in decision block 714. If not, the "NO" branch of decision block 714 is taken and the method proceeds to decision block 720 as described below. If the first object is associated with the user, the "YES" branch of decision block 714 is taken, the size of the object is added to the total size of the objects associated with the user in block 716, a total object count is incremented in block 718, and the method proceeds to decision block 720 where a decision is made as to whether or not the object is the last object in the object list. If so, the API returns the object count and the size of all of the objects in block 724. If the object is not the last object in the object list, the "NO" branch of decision block 720 is taken, the next object from the list is selected in block 722, and the method returns to decision block 714 where a decision is made as to whether or not the next object is associated with the user.

Figure 17:
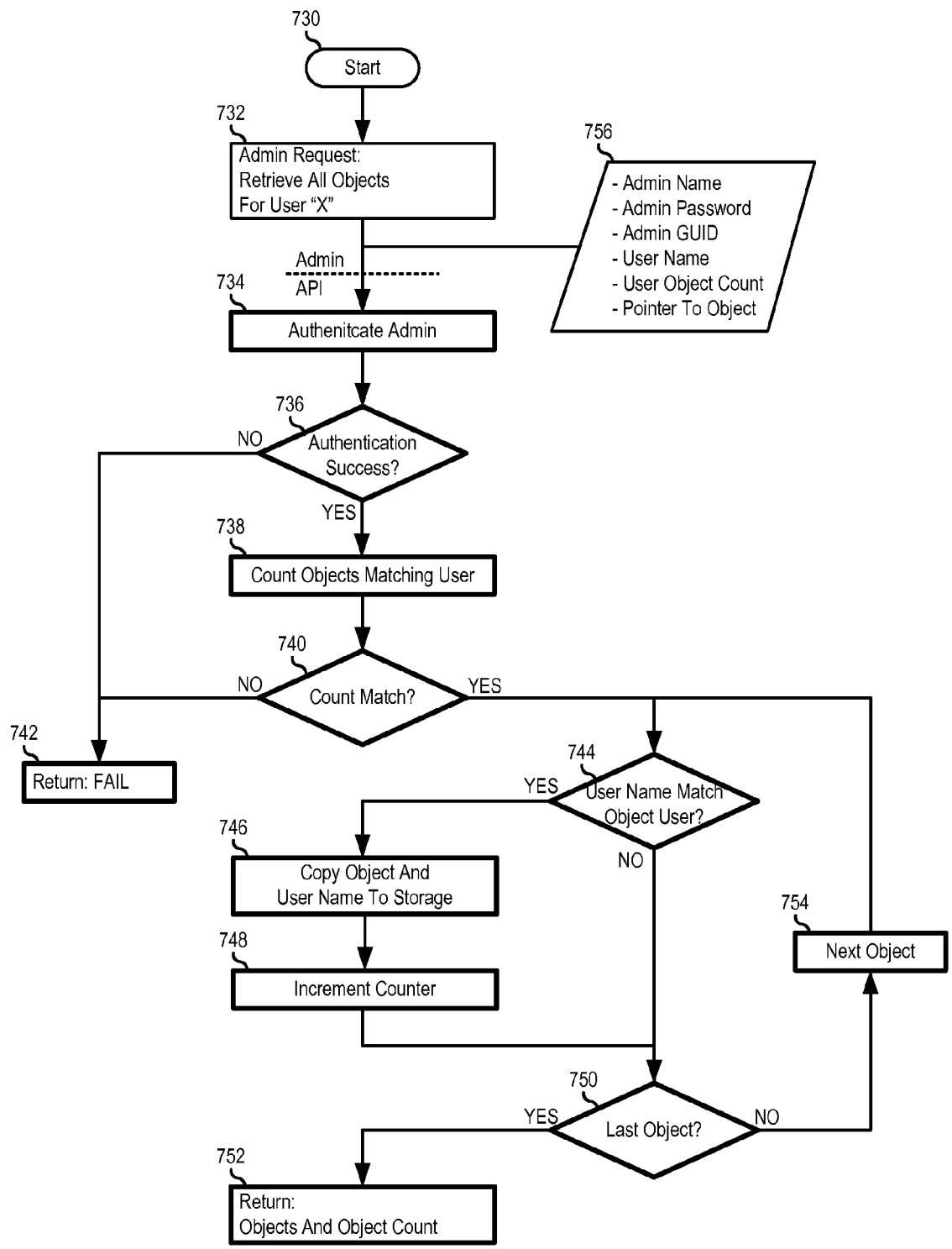

FIG. 17 illustrates a method for the administrator to retrieve all objects associated with a user, starting at block 730. The admin requests to retrieve all objects associated with the user in block 732 and provides database information 756 with the request. Database information 756 includes an admin name, an admin password, an admin GUID, the user name, a user object count, and a pointer to the first object. The method proceeds from the administrator application to the API where the API authenticates the admin based upon the admin name, the admin password, and the admin GUID in block 734. A decision is made as to whether or not the admin authentication was successful in decision block 736. If not, the "NO" branch of decision block 736 is taken and the API returns a request fail indication in block 742. If the admin authentication was successful, the "YES" branch of decision block 736 is taken, the objects in the silo that match the user are counted in block 738, and a decision is made as to whether or not the count of objects in the silo matches the provided object count in decision block 740. If not, the "NO" branch of decision block 740 is taken and the API returns a request fail indication in block 742.

If the count of objects in the silo matches the provided object count, the "YES" branch of decision block 740 is taken and a decision is made as to whether or not a first object matches the object user in decision block 744. If not, the "NO" branch of decision block 744 is taken and the method proceeds to decision block 750 as described below. If the first object matches the object user, the "YES" branch of decision block 744 is taken, the object and the user name are copied to the storage device in block 746, a total object count is incremented in block 748, and the method proceeds to decision block 750 where a decision is made as to whether or not the object is the last object in the object list. If so, the API returns the object and the object count in block 752. If the object is not the last object in the object list, the "NO" branch of decision block 750 is taken, the next object from the list is selected in block 754, and the method returns to decision block 744 where a decision is made as to whether or not the next object is associated with the user.

Figure 18:
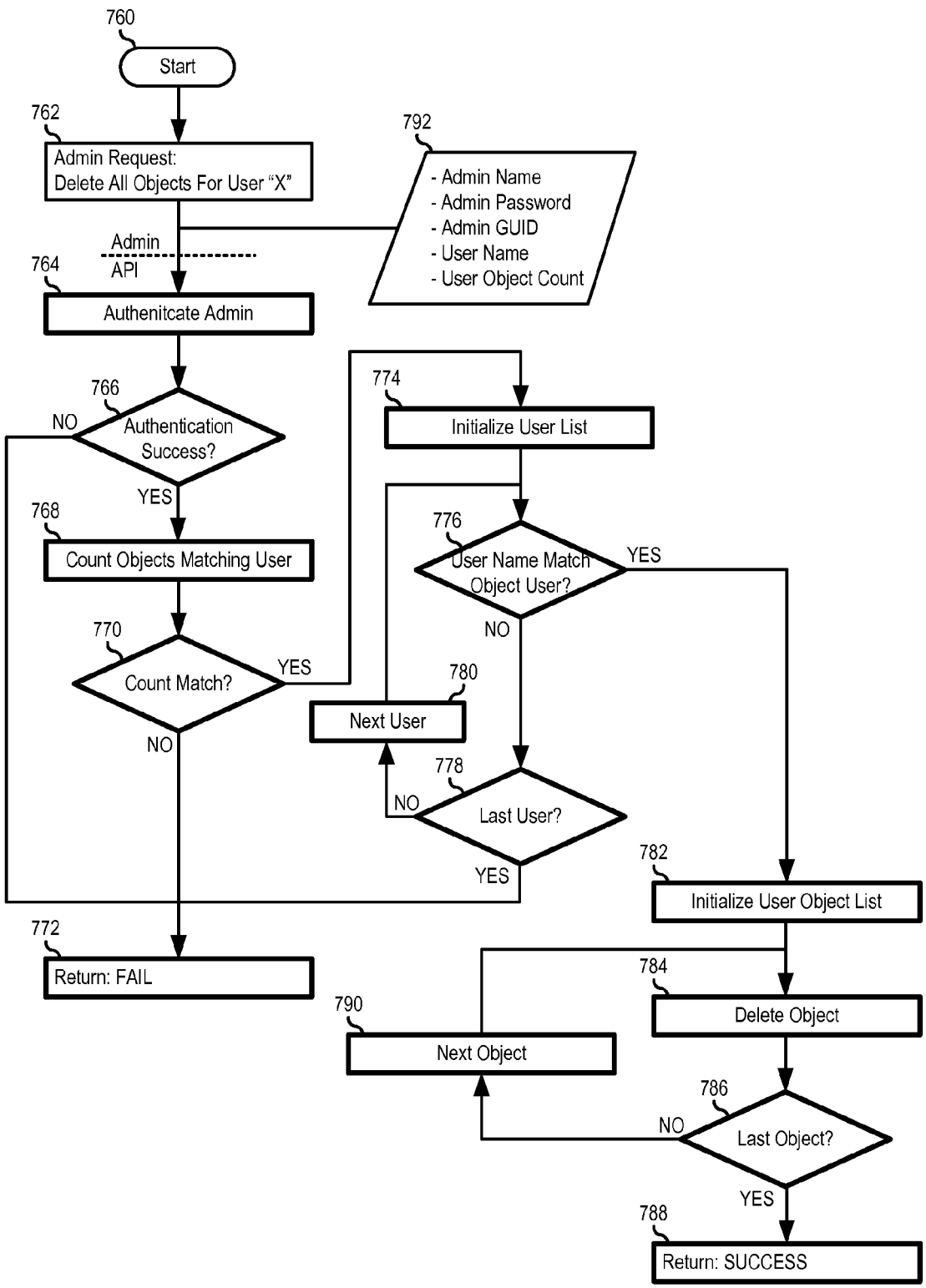

FIG. 18 illustrates a method for the administrator to request to delete all objects associated with a user, starting at block 760. The admin requests to delete all objects associated with the user in block 762 and provides database information 792 with the request. Database information 792 includes an admin name, an admin password, an admin GUID, the user name, and a user object count. The method proceeds from the administrator application to the API where the API authenticates the admin based upon the admin name, the admin password, and the admin GUID in block 764. A decision is made as to whether or not the admin authentication was successful in decision block 766. If not, the "NO" branch of decision block 766 is taken and the API returns a request fail indication in block 772. If the admin authentication was successful, the "YES" branch of decision block 766 is taken, the objects in the silo that match the user are counted in block 768, and a decision is made as to whether or not the count of objects in the silo matches the provided object count in decision block 770. If not, the "NO" branch of decision block 770 is taken and the API returns a request fail indication in block 772.

If the count of objects in the silo matches the provided object count, the "YES" branch of decision block 770 is taken, a user list is initialized in block 774, and a decision is made as to whether or not a first user name on the list matches the provided user name in decision block 776. If so, the "YES" branch of decision block 776 is taken and the method proceeds to block 782 as described below. If the first user name does not match the provided user name, the "NO" branch of decision block 776 is taken and a decision is made as to whether or not the user name is the last user name on the list in decision block 778. If so, the "YES" branch of decision block 778 is taken and the API returns a request fail indication in block 772. If the user name is not the last user name on the list, the "NO" branch of decision block 778 is taken, a next user is selected from the user list in block 780, and the method returns to decision block 776 where a decision is made as to whether or not the nest user name on the list matches the provided user name. Returning to decision block 776, if the selected user name matches the provided user name, the "YES" branch is taken, a user object list is initialized in block 782, and a first object on the object list is deleted in block 784. A decision is made as to whether or not the object is the last object on the list in decision block 786. If not, the "NO" branch of decision block 744 is taken, a next object on the object list is selected in block 790, and the method returns to block 784 where the next object is deleted. If the object is the last object on the list, the "YES" branch of decision block 786 is taken, and the API returns a request successful indication in block 788.

Figure 19:
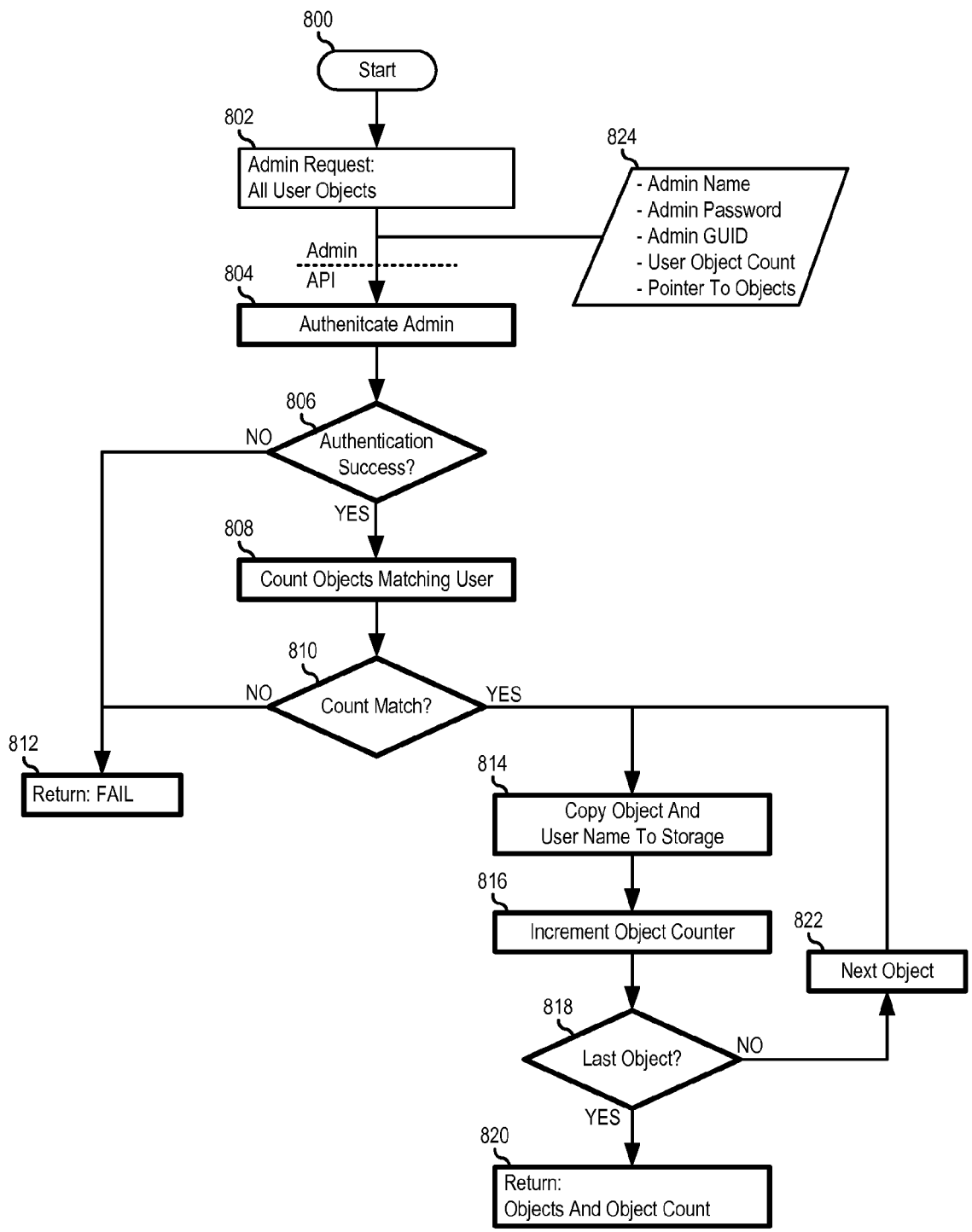

FIG. 19 illustrates a method for the administrator to retrieve all user objects, starting at block 800. The admin requests to retrieve all user objects in block 802 and provides database information 824 with the request. Database information 824 includes an admin name, an admin password, an admin GUID, a user object count, and a pointer to the first object. The method proceeds from the administrator application to the API where the API authenticates the admin based upon the admin name, the admin password, and the admin GUID in block 804. A decision is made as to whether or not the admin authentication was successful in decision block 806. If not, the "NO" branch of decision block 806 is taken and the API returns a request fail indication in block 812. If the admin authentication was successful, the "YES" branch of decision block 806 is taken, the objects in the silo are counted in block 808, and a decision is made as to whether or not the count of objects in the silo matches the provided object count in decision block 810. If not, the "NO" branch of decision block 810 is taken and the API returns a request fail indication in block 812.

If the count of objects in the silo matches the provided object count, the "YES" branch of decision block 810 is taken, a first object and the associated user name are copied to the storage device in block 814, an object counter is incremented in block 816, and a decision is made as to whether or not the object is the last object in the object list in decision block 818. If so, the "YES" branch of decision block 818 is taken and the API returns the objects and the object count in block 820. If the object is not the last object in the object list, the "NO" branch of decision block 818 is taken, the next object from the list is selected in block 822, and the method returns to block 814 where, the next object and the associated user name are copied to the storage device.

Figure 20:
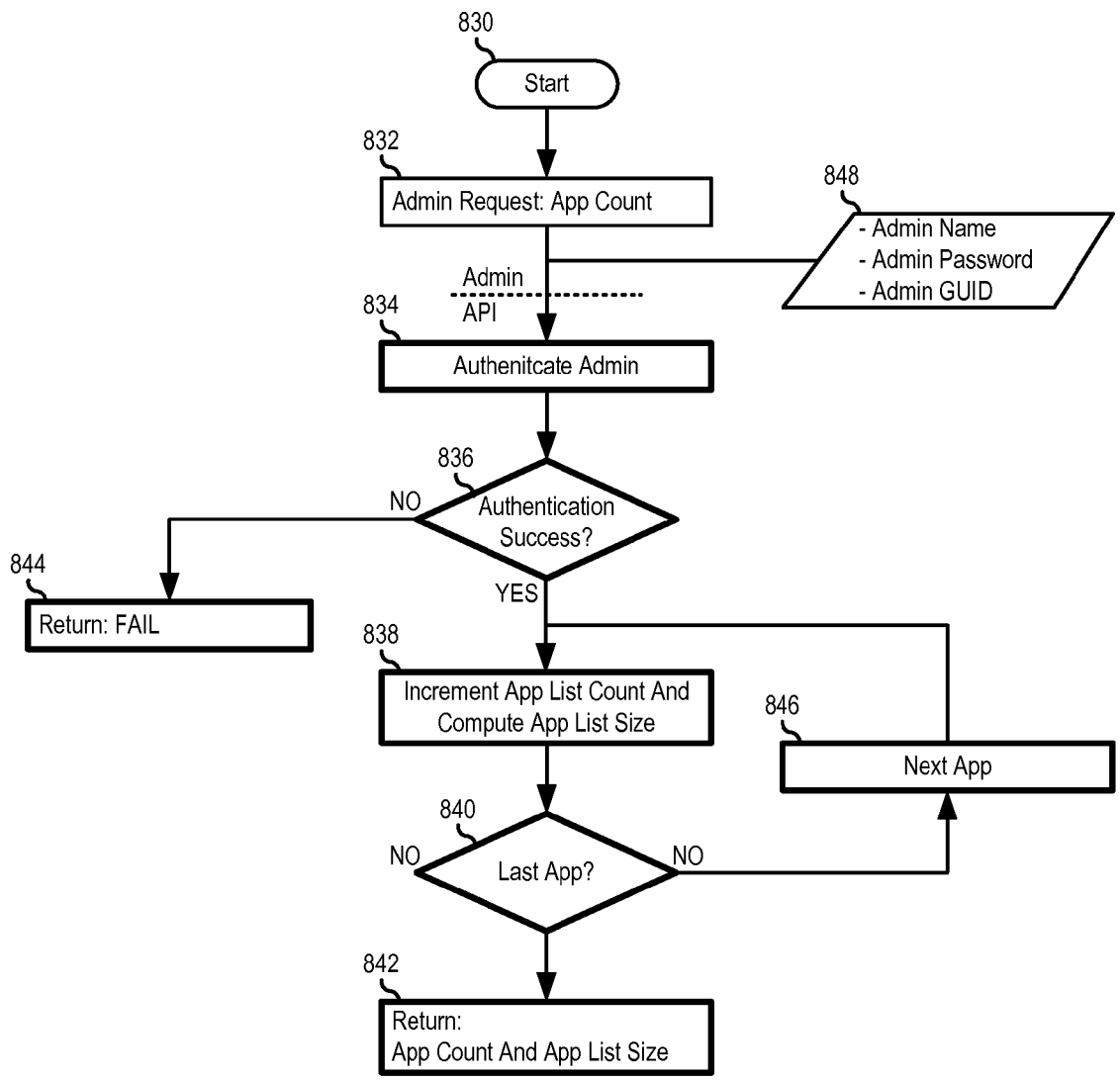

FIG. 20 illustrates a method for the administrator to request an application count, starting at block 830. The admin requests the application count in block 832 and provides database information 848 with the request. Database information 848 includes an admin name, an admin password, and an admin GUID. The method proceeds from the administrator application to the API where the API authenticates the admin based upon the admin name, the admin password, and the admin GUID in block 834. A decision is made as to whether or not the admin authentication was successful in decision block 836. If not, the "NO" branch of decision block 836 is taken and the API returns a request fail indication in block 844. If the admin authentication was successful, the "YES" branch of decision block 836 is taken, an application list count is incremented and an application list size is computed in block 838 and a decision is made as to whether or not the application is the last application in decision block 840. If not, the "NO" branch of decision block 840 is taken, the next application is selected in block 846, and the method returns to block 836 where the application list count is incremented and an application list size is recomputed. If the application is the last application, the "YES" branch of decision block 840 is taken and the API returns the application count and the application list size in block 842.

Figure 21:
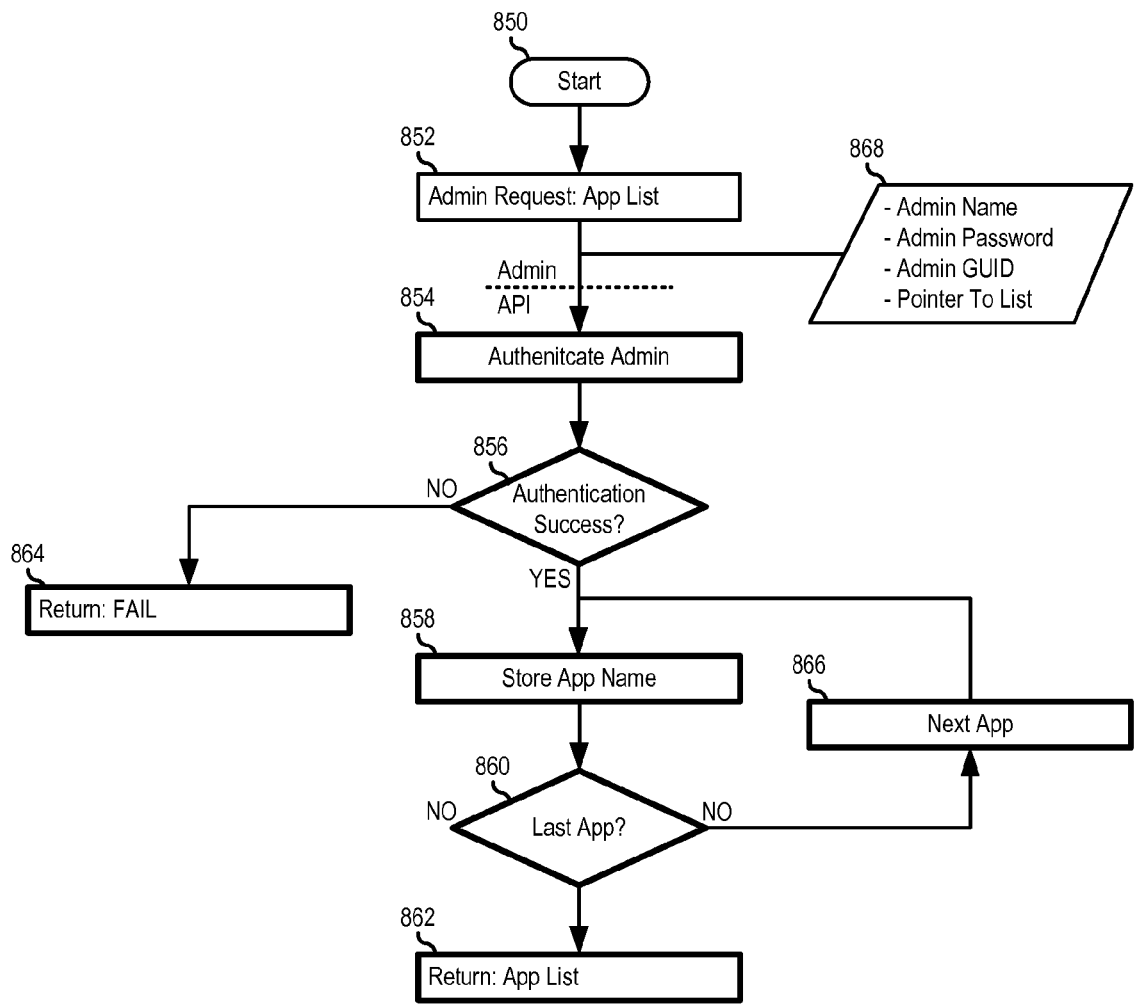

FIG. 21 illustrates a method for the administrator to request a list of applications, starting at block 850. The admin requests the list of applications in block 852 and provides database information 868 with the request. Database information 868 includes an admin name, an admin password, an admin GUID, and a pointer to the first application. The method proceeds from the administrator application to the API where the API authenticates the admin based upon the admin name, the admin password, and the admin GUID in block 854. A decision is made as to whether or not the admin authentication was successful in decision block 856. If not, the "NO" branch of decision block 856 is taken and the API returns a request fail indication in block 864. If the admin authentication was successful, the "YES" branch of decision block 856 is taken, the first application name is stored on the storage device in block 858 and a decision is made as to whether or not the application is the last application in decision block 860. If not, the "NO" branch of decision block 860 is taken, the next application is selected in block 866, and the method returns to block 858 where the next application name is stored on the storage device. If the application is the last application, the "YES" branch of decision block 860 is taken and the API returns the application list in block 862.

Figure 22:
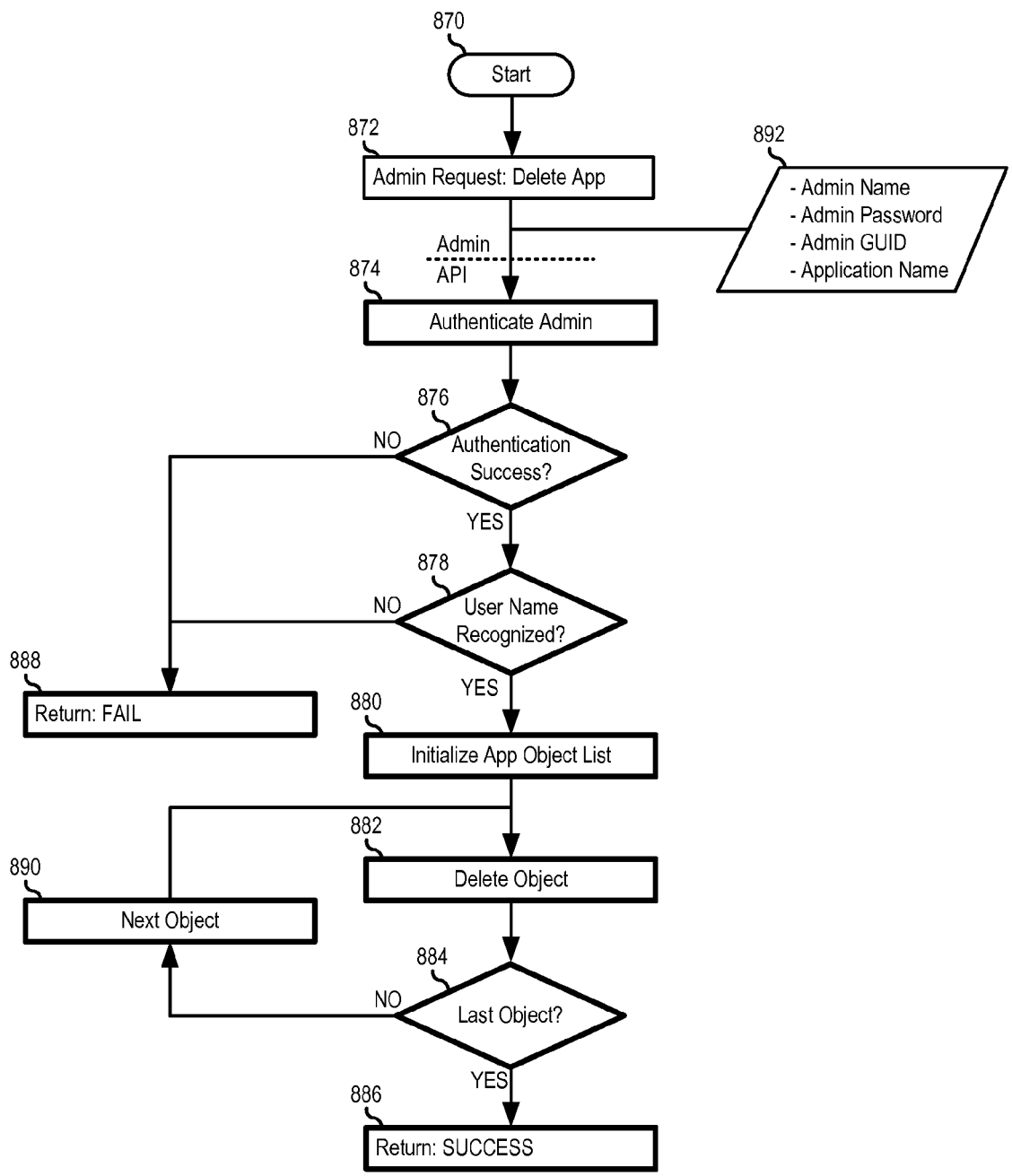

FIG. 22 illustrates a method for the administrator to request to delete an application, starting at block 870. The admin requests to delete the application in block 872 and provides database information 892 with the request. Database information 892 includes an admin name, an admin password, an admin GUID, and the application. The method proceeds from the administrator application to the API where the API authenticates the admin based upon the admin name, the admin password, and the admin GUID in block 874. A decision is made as to whether or not the admin authentication was successful in decision block 876. If not, the "NO" branch of decision block 876 is taken and the API returns a request fail indication in block 888. If the admin authentication was successful, the "YES" branch of decision block 876 is taken and a decision is made as to whether or not the application is recognized in decision block 878. If not, the "NO" branch of decision block 878 is taken and the API returns a request fail indication in block 888. If the application was recognized, the "YES" branch of decision block 878 is taken and an object list of the objects associated with the application is initialized in block 880. A first object of the object list deleted in block 882 and a decision is made as to whether or not the object is the last object in the object list in decision block 884. If so, the API a requests successful indication in block 886. If the object is not the last object in the object list, the "NO" branch of decision block 884 is taken, the next object from the object list is selected in block 890, and the method returns to decision block 882 where the next object is deleted.

Figure 23:
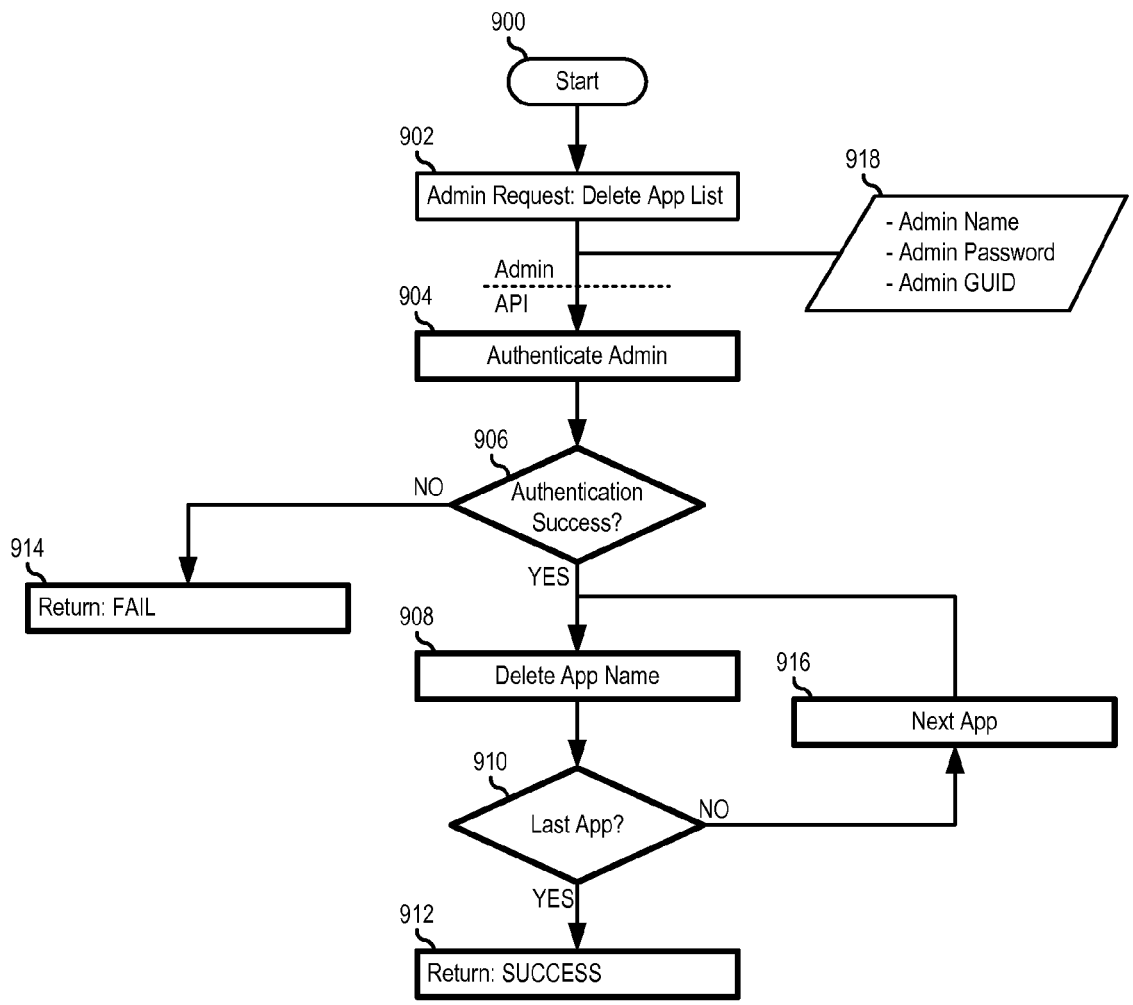

FIG. 23 illustrates a method for the administrator to request to delete a list of applications, starting at block 900. The admin requests to delete the list of applications in block 902 and provides database information 918 with the request. Database information 918 includes an admin name, an admin password, and an admin GUID. The method proceeds from the administrator application to the API where the API authenticates the admin based upon the admin name, the admin password, and the admin GUID in block 904. A decision is made as to whether or not the admin authentication was successful in decision block 906. If not, the "NO" branch of decision block 906 is taken and the API returns a request fail indication in block 914. If the admin authentication was successful, the "YES" branch of decision block 906 is taken and a first application name is deleted from the silo in block 908. A decision is made as to whether or not the application is the last application in the application list in decision block 910. If so, the API a requests successful indication in block 912. If the application is not the last application in the application list, the "NO" branch of decision block 910 is taken, the next application from the application list is selected in block 916, and the method returns to decision block 908 where the next application name is deleted.

Figure 24:
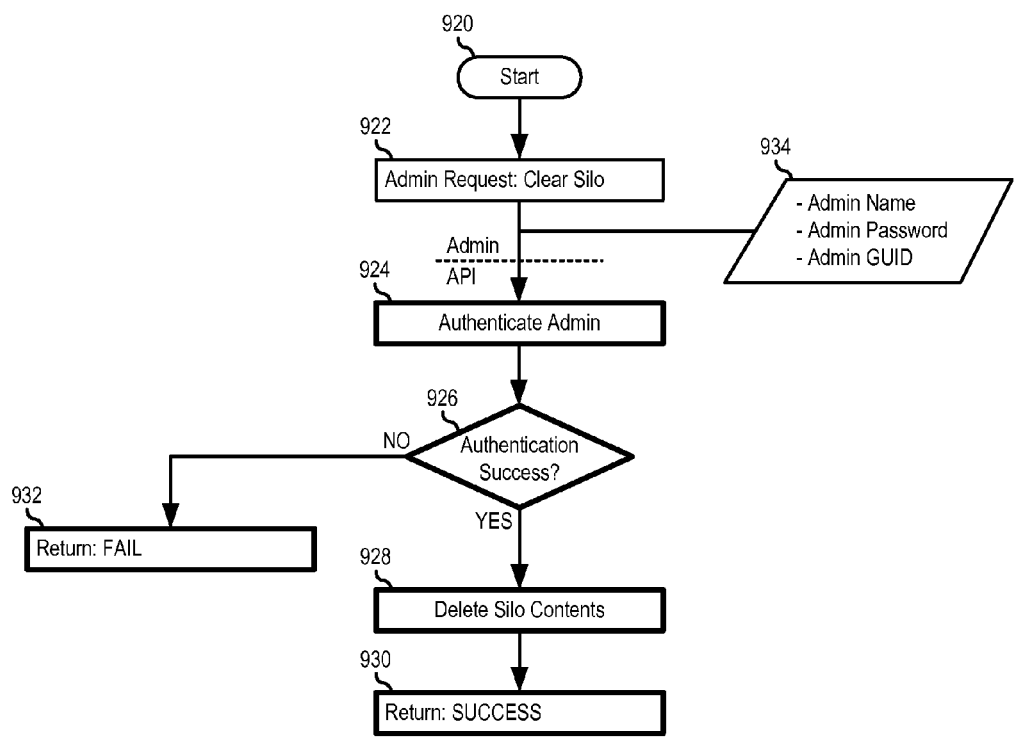

FIG. 24 illustrates a method for the administrator to request to clear the silo, starting at block 920. The admin requests to clear the silo in block 922 and provides database information 934 with the request. Database information 934 includes an admin name, an admin password, and an admin GUID. The method proceeds from the administrator application to the API where the API authenticates the admin based upon the admin name, the admin password, and the admin GUID in block 924. A decision is made as to whether or not the admin authentication was successful in decision block 926. If not, the "NO" branch of decision block 926 is taken and the API returns a request fail indication in block 932. If the admin authentication was successful, the "YES" branch of decision block 926 is taken, the contents of the silo are deleted in block 928, and the API returns a request successful indication in block 930.

Figure 25:
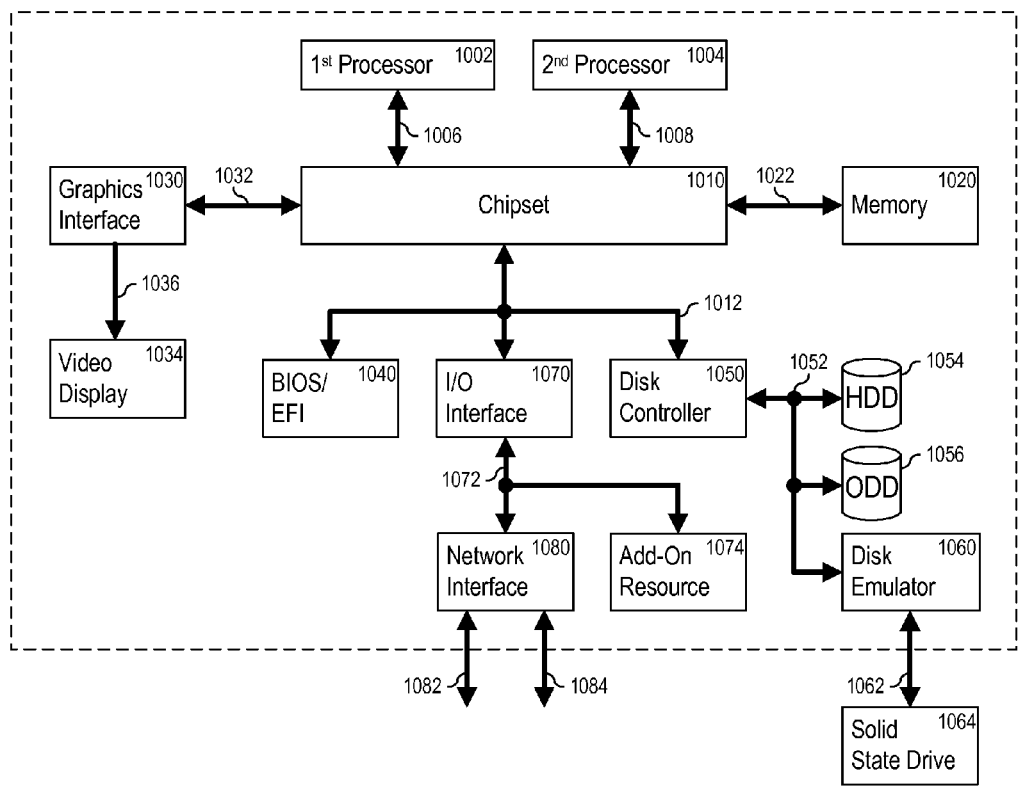
FIG. 25 is a block diagram illustrating a generalized information handling system according to an embodiment of the present disclosure.

FIG. 25 illustrates a generalized embodiment of information handling system 1000. Information handling system 1000 can include devices or modules that embody one or more of the devices or modules described above, and operates to perform one or more of the methods described above. Information handling system 1000 includes a processors 1002 and 1004, a chipset 1010, a memory 1020, a graphics interface 1030, include a basic input and output system/extensible firmware interface (BIOS/EFI) module 1040, a disk controller 1050, a disk emulator 1060, an input/output (I/O) interface 1070, and a network interface 1080. Processor 1002 is connected to chipset 1010 via processor interface 1006, and processor 1004 is connected to the chipset via processor interface 1008. Memory 1020 is connected to chipset 1010 via a memory bus 1022. Graphics interface 1030 is connected to chipset 1010 via a graphics interface 1032, and provides a video display output 1036 to a video display 1034. In a particular embodiment, information handling system 1000 includes separate memories that are dedicated to each of processors 1002 and 1004 via separate memory interfaces. An example of memory 1020 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 1040, disk controller 1050, and I/O interface 1070 are connected to chipset 1010 via an I/O channel 1012. An example of I/O channel 1012 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 1010 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 1040 includes BIOS/EFI code operable to detect resources within information handling system 1000, to provide drivers for the resources, initialize the resources, and access the resources. BIOS/EFI module 1040 includes code that operates to detect resources within information handling system 1000, to provide drivers for the resources, to initialize the resources, and to access the resources.

Disk controller 1050 includes a disk interface 1052 that connects the disc controller to a hard disk drive (HDD) 1054, to an optical disk drive (ODD) 1056, and to disk emulator 1060. An example of disk interface 1052 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 1060 permits a solid-state drive 1064 to be coupled to information handling system 1000 via an external interface 1062. An example of external interface 1062 includes a USB interface, an IEEE 1394 (Firewire) interface, a proprietary interface, or a combination thereof. Alternatively, solid-state drive 1064 can be disposed within information handling system 1000.

I/O interface 1070 includes a peripheral interface 1072 that connects the I/O interface to an add-on resource 1074 and to network interface 1080. Peripheral interface 1072 can be the same type of interface as I/O channel 1012, or can be a different type of interface. As such, I/O interface 1070 extends the capacity of I/O channel 1012 when peripheral interface 1072 and the I/O channel are of the same type, and the I/O interface translates information from a format suitable to the I/O channel to a format suitable to the peripheral channel 1072 when they are of a different type. Add-on resource 1074 can include a data storage system, an additional graphics interface, a network interface card (NIC), a sound/video processing card, another add-on resource, or a combination thereof. Add-on resource 1074 can be on a main circuit board, on separate circuit board or add-in card disposed within information handling system 1000, a device that is external to the information handling system, or a combination thereof.

Network interface 1080 represents a NIC disposed within information handling system 1000, on a main circuit board of the information handling system, integrated onto another component such as chipset 1010, in another suitable location, or a combination thereof. Network interface device 1080 includes network channels 1082 and 1084 that provide interfaces to devices that are external to information handling system 1000. In a particular embodiment, network channels 1082 and 1084 are of a different type than peripheral channel 1072 and network interface 1080 translates information from a format suitable to the peripheral channel to a format suitable to external devices. An example of network channels 1082 and 1084 includes InfiniBand channels, Fibre Channel channels, Gigabit Ethernet channels, proprietary channel architectures, or a combination thereof. Network channels 1082 and 1084 can be coupled to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   storing, to an encrypted silo on a first information handling system, a first credential object for a first user, the first credential object being operative to authenticate the first user to use a first application on the first information handling system;
   copying the encrypted silo from the first information handling system to a second information handling system;
   retrieving, at the second information handling system, the first credential object from the copy of the encrypted silo; and
   authenticating the first user to use the first application on the second information handling system using the first credential object.

2. The method of claim 1, further comprising:
   prior to copying the encrypted silo from the first information handling system to the second information handling system, storing, to the encrypted silo, a second credential object for the first user, the second credential object being operative to authenticate the first user on a second application
   retrieving, at the second information handling system, the second credential object from the copy of the encrypted silo; and
   authenticating the first user to use the second application on the second information handling system using the second credential object.

3. The method of claim 1, further comprising:
   prior to copying the encrypted silo from the first information handling system to the second information handling system, storing, to the encrypted silo, a second credential object for a second user, the second credential object being operative to authenticate the second user to use the first application; and
   deleting, at the second information handling system, the second credential object from the copy of the encrypted silo.

4. The method of claim 3, further comprising:
   deleting, at the first information handling system, the second credential object from the encrypted silo in response to copying the encrypted silo from the first information handling system to the second information handling system.

5. The method of claim 1, wherein the first credential object comprises a biometric sensor template associated with a biometric marker of the first user.

6. The method of claim 1, wherein the first credential object comprises a pointer to a biometric sensor template associated with a biometric marker of the first user, the biometric sensor template being stored at a biometric sensor of the first information handling system.

7. The method of claim 1, wherein, in authenticating the first user to use the first application, the method further comprises:
   requesting, by the first application, the user to provide a second credential object,
   comparing the first credential object with the second credential object; and
   authenticating the first user to use the first application when the first authentication object matches the second authentication object.

8. The method of claim 1, wherein, in authenticating the first user to use the first application, the method further comprises:
   providing the first authentication object to a network log in application.

9. A method comprising:
   storing, to an encrypted silo on a first information handling system, a first credential object for a first user, the first credential object being operative to authenticate the first user to use a first application on the first information handling system;
   copying the encrypted silo from the first information handling system to a second information handling system;
   retrieving, at the second information handling system, the first credential object from the copy of the encrypted silo; and
   authenticating the first user to use the first application on the second information handling system using the first credential object.

10. The method of claim 9, further comprising:
    prior to copying the encrypted silo from the first information handling system to the second information handling system, storing, to the encrypted silo, a second credential object for the first user, the second credential object being operative to authenticate the first user on a second application
    retrieving, at the second information handling system, the second credential object from the copy of the encrypted silo; and
    authenticating the first user to use the second application on the second information handling system using the second credential object.

11. The method of claim 9, further comprising:
prior to copying the encrypted silo from the first information handling system to the second information handling system, storing, to the encrypted silo, a second credential object for a second user, the second credential object being operative to authenticate the second user to use the first application; and
deleting, at the second information handling system, the second credential object from the copy of the encrypted silo.

12. The method of claim 11, further comprising:
deleting, at the first information handling system, the second credential object from the encrypted silo in response to copying the encrypted silo from the first information handling system to the second information handling system.

13. The method of claim 9, wherein the first credential object comprises a biometric sensor template associated with a biometric marker of the first user.

14. The method of claim 9, wherein the first credential object comprises a pointer to a biometric sensor template associated with a biometric marker of the first user, the biometric sensor template being stored at a biometric sensor of the first information handling system.

15. The method of claim 9, wherein, in authenticating the first user to use the first application, the method further comprises:
requesting, by the first application, the user to provide a second credential object,
comparing the first credential object with the second credential object; and
authenticating the first user to use the first application when the first authentication object matches the second authentication object.

16. The method of claim 9, wherein, in authenticating the first user to use the first application, the method further comprises:
providing the first authentication object to a network log in application.

17. A non-transitory computer-readable medium including code for performing a method, the method comprising:
storing, to an encrypted silo on a first information handling system, a first credential object for a first user, the first credential object being operative to authenticate the first user to use a first application on the first information handling system;
copying the encrypted silo from the first information handling system to a second information handling system;
retrieving, at the second information handling system, the first credential object from the copy of the encrypted silo; and
authenticating the first user to use the first application on the second information handling system using the first credential object.

18. The computer-readable medium of claim 17, the method further comprising:
prior to copying the encrypted silo from the first information handling system to the second information handling system, storing, to the encrypted silo, a second credential object for the first user, the second credential object being operative to authenticate the first user on a second application
retrieving, at the second information handling system, the second credential object from the copy of the encrypted silo; and
authenticating the first user to use the second application on the second information handling system using the second credential object.

19. The computer-readable medium of claim 17, the method further comprising:
prior to copying the encrypted silo from the first information handling system to the second information handling system, storing, to the encrypted silo, a second credential object for a second user, the second credential object being operative to authenticate the second user to use the first application; and
deleting, at the second information handling system, the second credential object from the copy of the encrypted silo.

20. The computer-readable medium of claim 19, the method further comprising:
deleting, at the first information handling system, the second credential object from the encrypted silo in response to copying the encrypted silo from the first information handling system to the second information handling system.

* * * * *